United States Patent [19]
Allio

[11] Patent Number: 5,946,027
[45] Date of Patent: *Aug. 31, 1999

[54] AUTOSTEREOSCOPIC VIDEO DEVICE

[76] Inventor: Pierre Allio, 81, rue de la Mare, 75020 Paris, France

[*] Notice: This patent is subject to a terminal disclaimer.

[21] Appl. No.: 08/921,216

[22] Filed: Aug. 27, 1997

Related U.S. Application Data

[62] Division of application No. 08/537,834, filed as application No. PCT/FR94/26071, Apr. 26, 1994, Pat. No. 5,719,620.

[30] Foreign Application Priority Data

| May 5, 1993 | [FR] | France | 9305380 |
| May 5, 1993 | [FR] | France | 9305381 |
| May 5, 1993 | [FR] | France | 9305384 |

[51] Int. Cl.$^6$ .............................. H04N 13/02; H04N 9/47
[52] U.S. Cl. .............................. 348/49; 348/50; 348/51; 348/59; 352/57; 359/462
[58] Field of Search .................... 348/49, 42, 43, 348/44, 45, 46, 47, 59, 50, 51; 352/57, 58, 60; 359/462, 463, 458

[56] References Cited

U.S. PATENT DOCUMENTS

| 3,674,921 | 7/1972 | Goldsmith . |
| 3,932,699 | 1/1976 | Tripp . |
| 4,945,407 | 7/1990 | Winnek . |
| 5,099,320 | 3/1992 | Allio . |
| 5,448,322 | 9/1995 | Bacs, Jr. . |
| 5,546,120 | 8/1996 | Miller et al. . |
| 5,719,620 | 2/1998 | Allio ...................................... 348/49 |

FOREIGN PATENT DOCUMENTS

| 84998 | 8/1983 | European Pat. Off. . |
| 0354851 | 7/1984 | European Pat. Off. . |
| 0267000 | 11/1988 | European Pat. Off. . |
| 1362617 | 4/1964 | France . |
| 57-161737 | 10/1982 | Japan . |
| 59-13488 | 2/1990 | Japan . |

OTHER PUBLICATIONS

Search Report for French 486575 and 9305384 dated Jan. 20, 1994.

3D–Aufnahme–und Wiedergabeverfahren in Theorie und praktischer Anwendung, R. Böner, Fernseh–Und Kino–Technik, 41, Jahrgang, Nr. Apr. 1987, pp. 145–149.

Patent Abstracts of Japan, JP A 02 039 034, Feb. 8, 1990, Nippon Telegr & Teleph Corp. —vol. 14, No. 195 (P–1039) Apr. 20, 1990.

M. Ueda et al., "TV Transmission of Three–Dimensional Scenes by Using Fly's Eye Lenses", *Japanese Journal of Applied Physics*, vol. 16, No. 7, Jul. 1977, Tokyo JP, pp. 1269–1270.

*Parallax Barrrier Display Systems,* I. Sexton, Imaging and Displays Research Group, School of Computing and Mathmatical Sciences, De Montfort University Leicester, pp. 1–5.

*Primary Examiner*—Tommy P. Chin
*Assistant Examiner*—Tung Vo
*Attorney, Agent, or Firm*—Alston & Bird, LLP

[57] ABSTRACT

A single camera autostereoscopic video device including an array of cylindrical lenses. The device includes a single inlet objective having a single optical axis. The lens array is positioned substantially in the image focal plane of the entrance objective and has a focal length such that for an image area equal to the pitch of the lenses constituting the array, the image of the entrance pupil of the inlet objective has a nominal width equal to the pitch. The device also includes a transfer optical system and an image sensor. The transfer optical system directs the light rays which emerge from the lens array onto the image sensor. The image of the lens array in the transfer optical system being such that the pitch of the lenses of the lens array corresponds therein to an integer number of image points (pixels) of the image sensor.

13 Claims, 16 Drawing Sheets

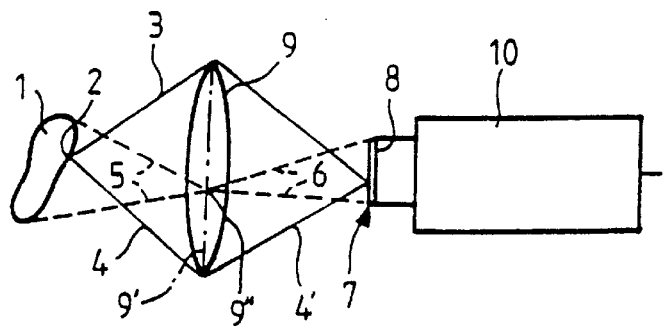
FIG_1
(PRIOR ART)
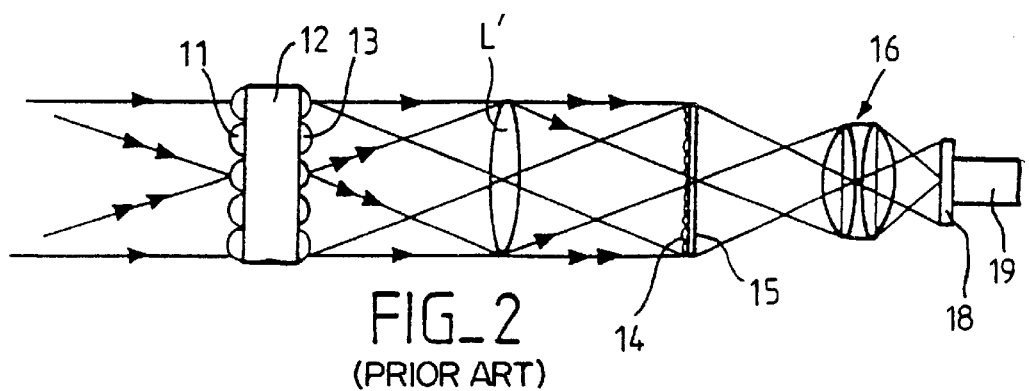
FIG_2
(PRIOR ART)
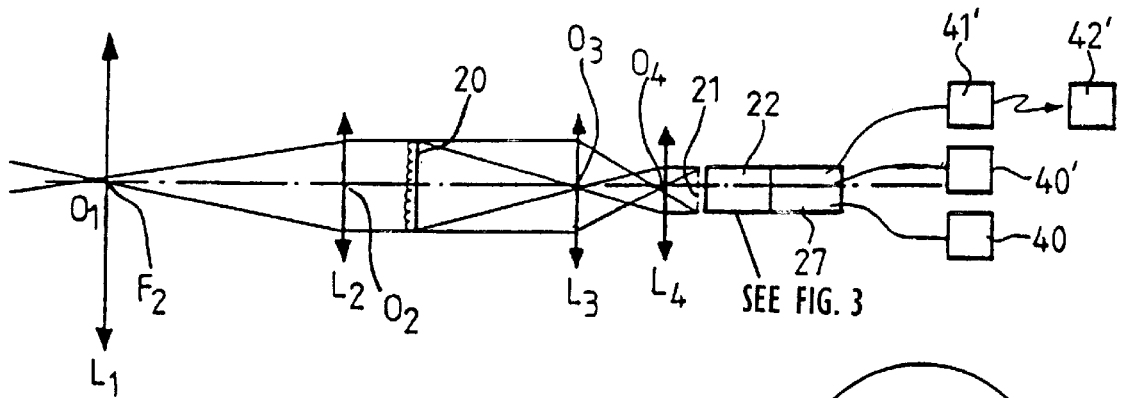
FIG_3a
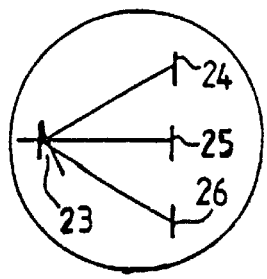
FIG_3

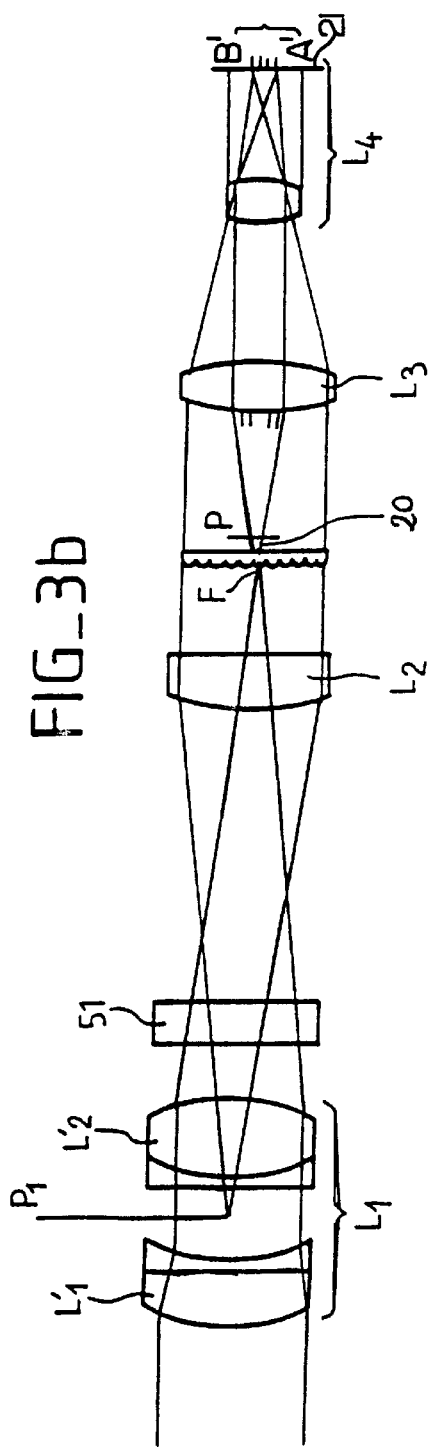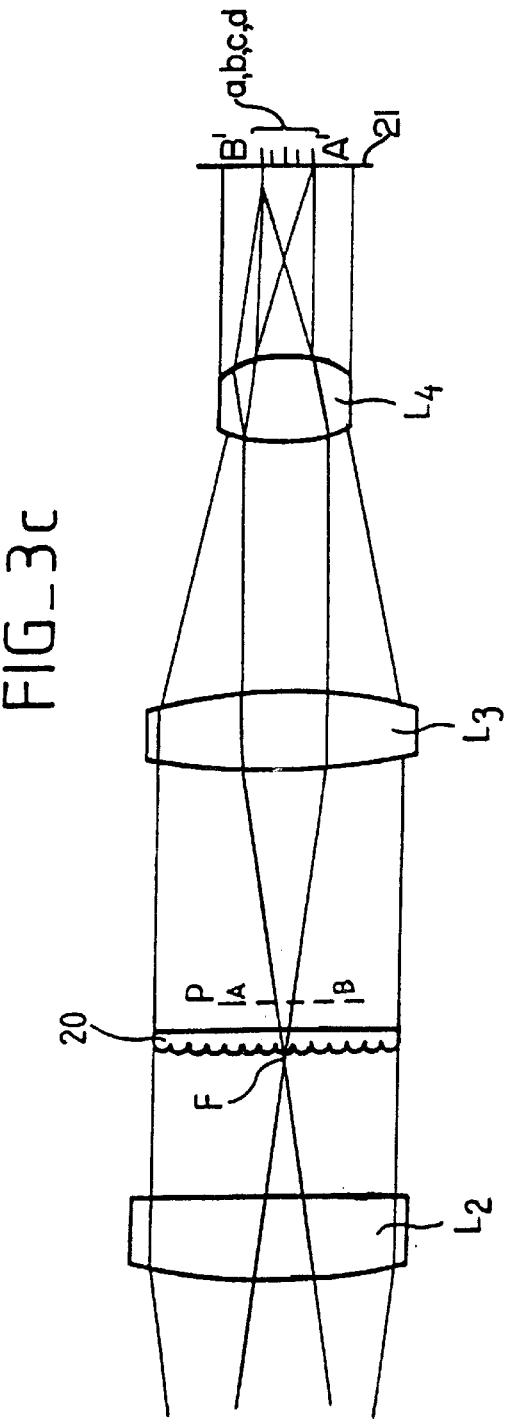

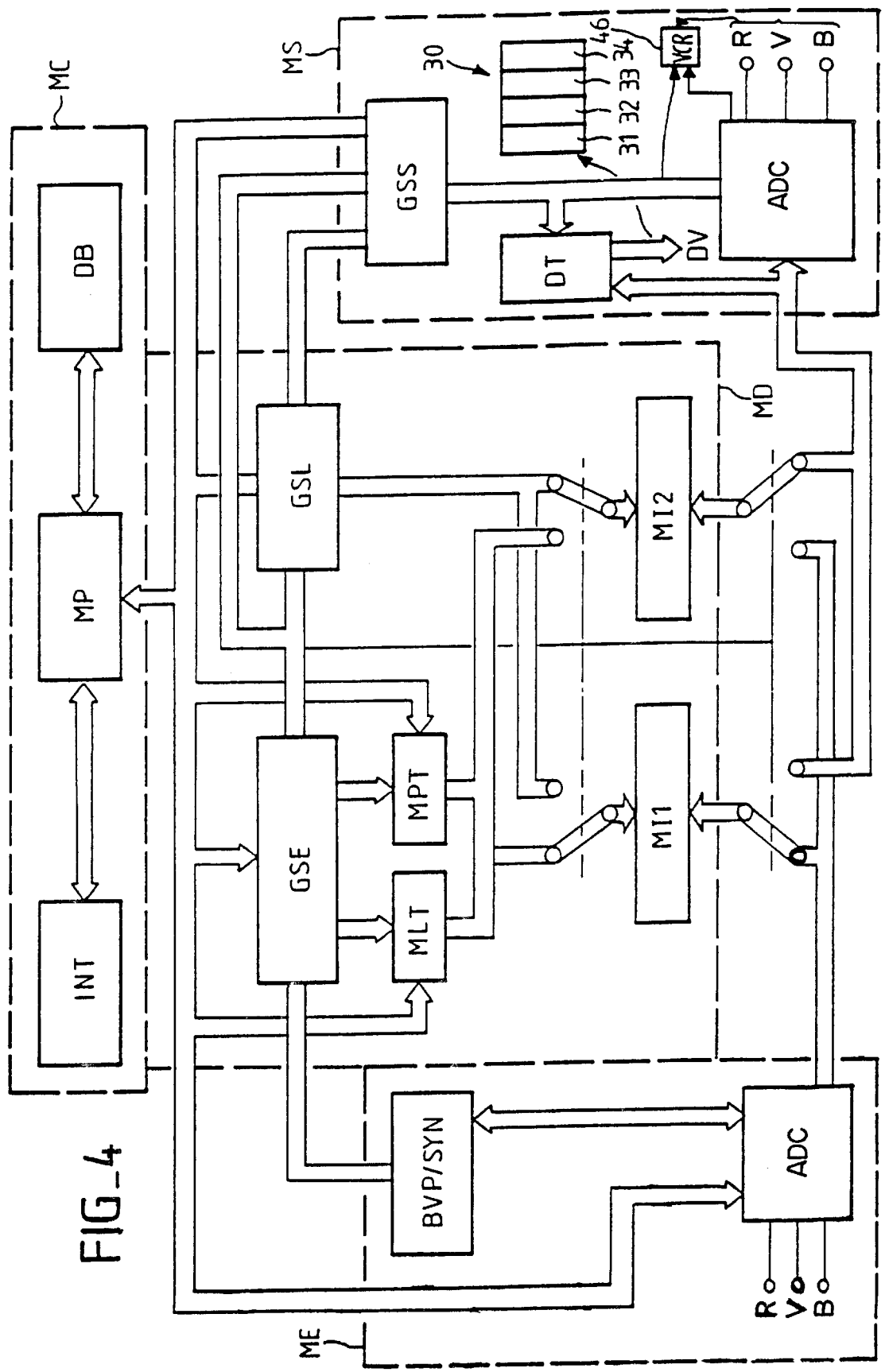
FIG_4

FIG_5
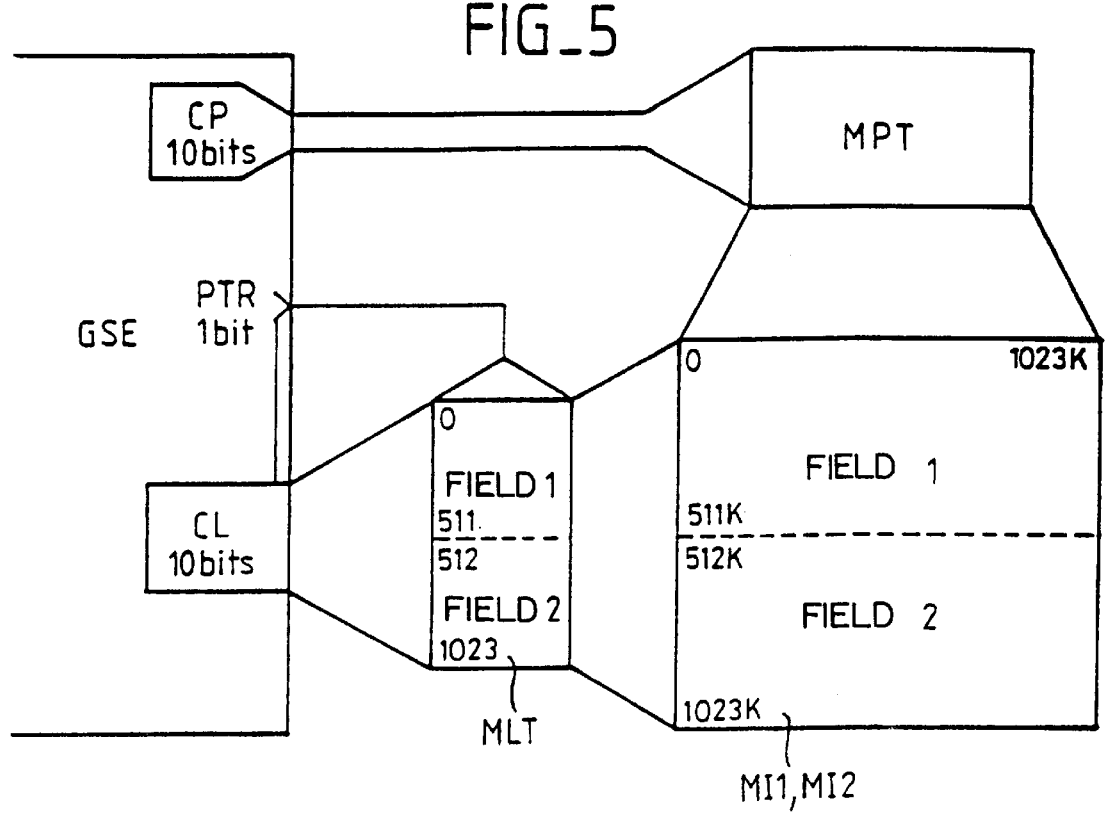
FIG_6
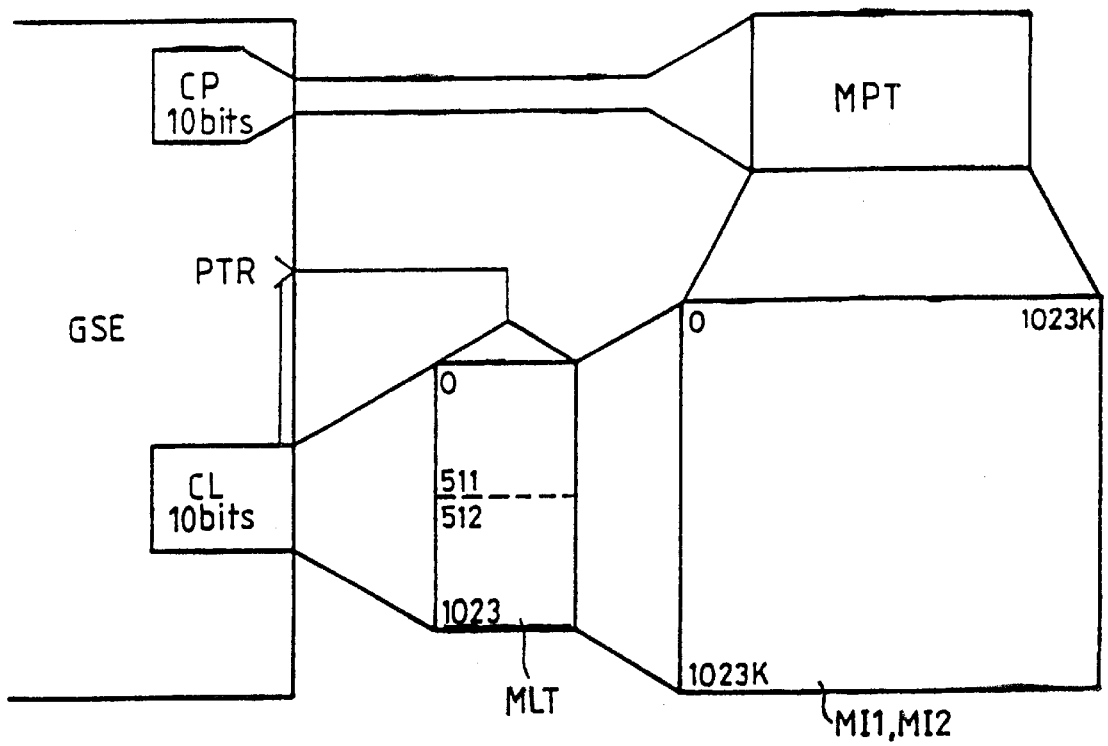

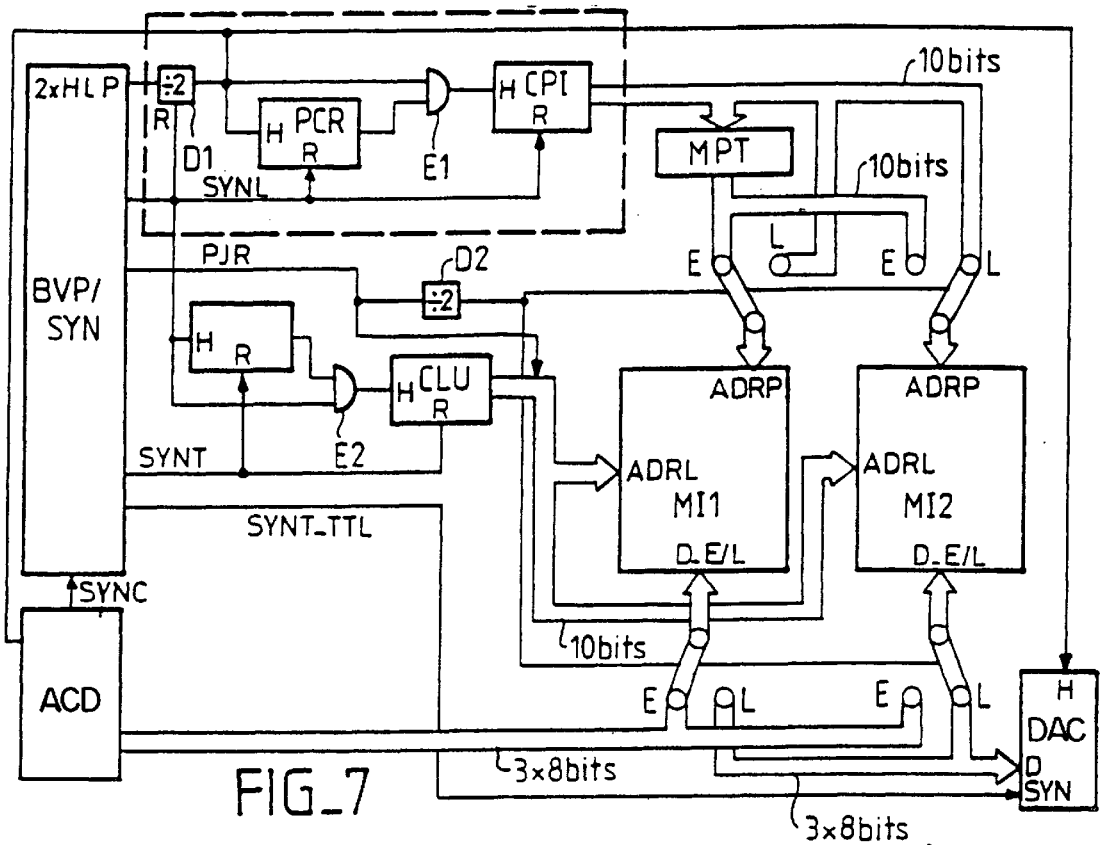
FIG_7
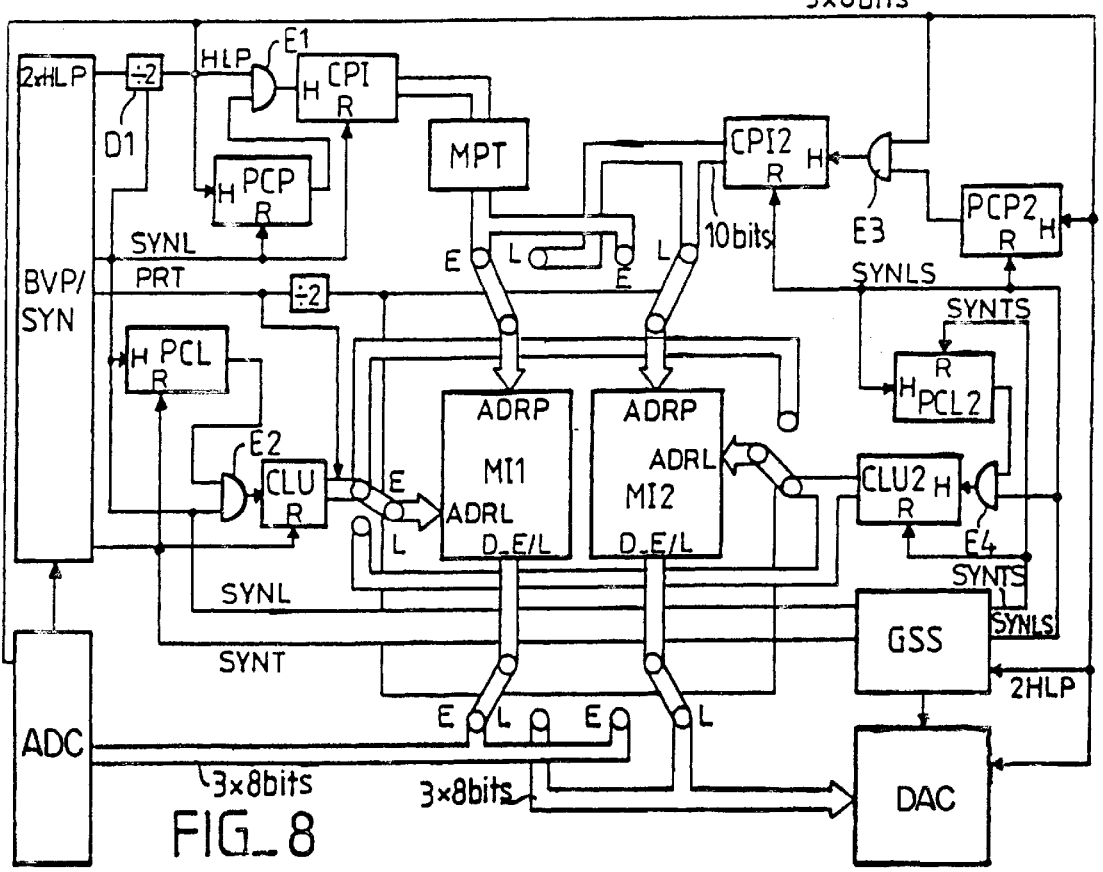
FIG_8

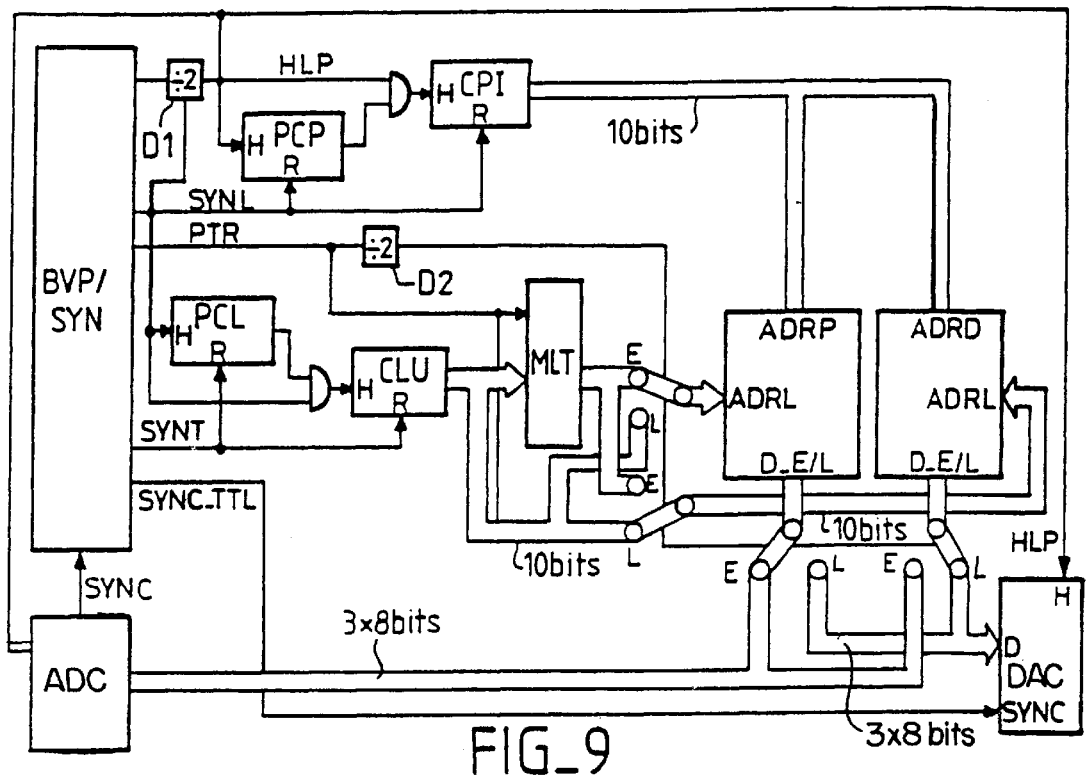
FIG_9
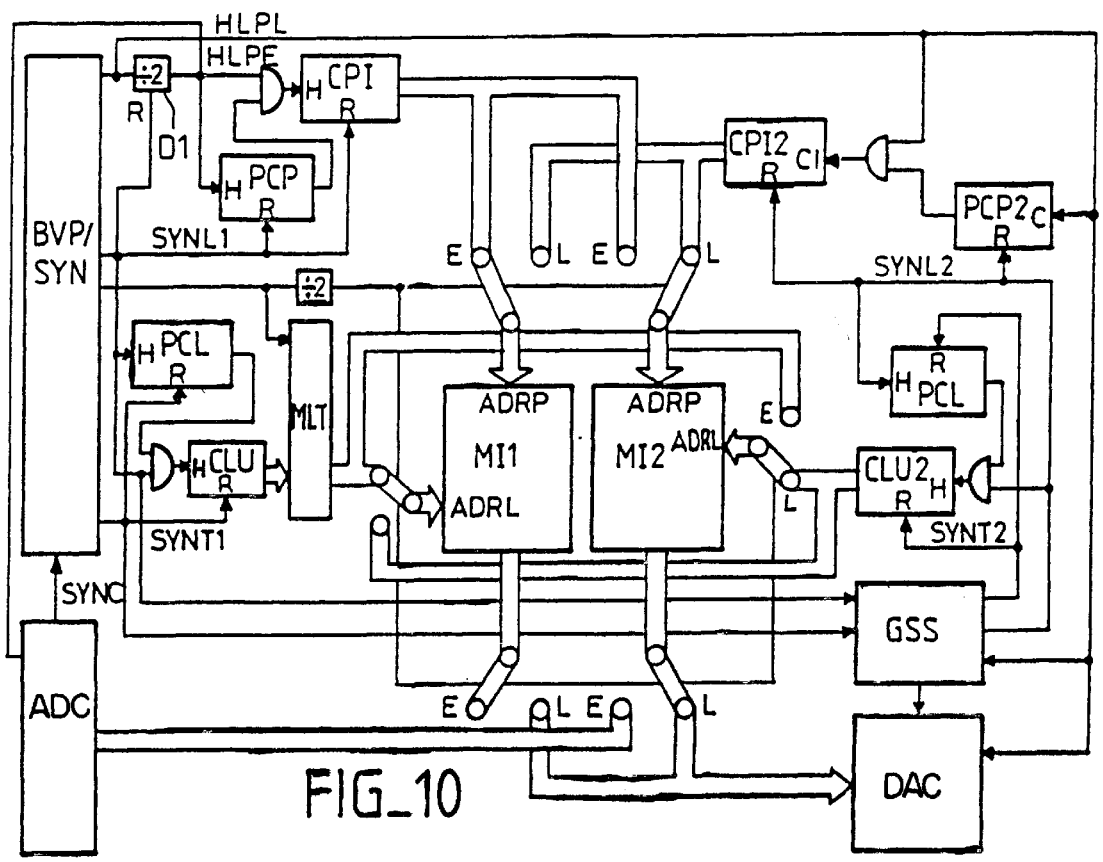
FIG_10

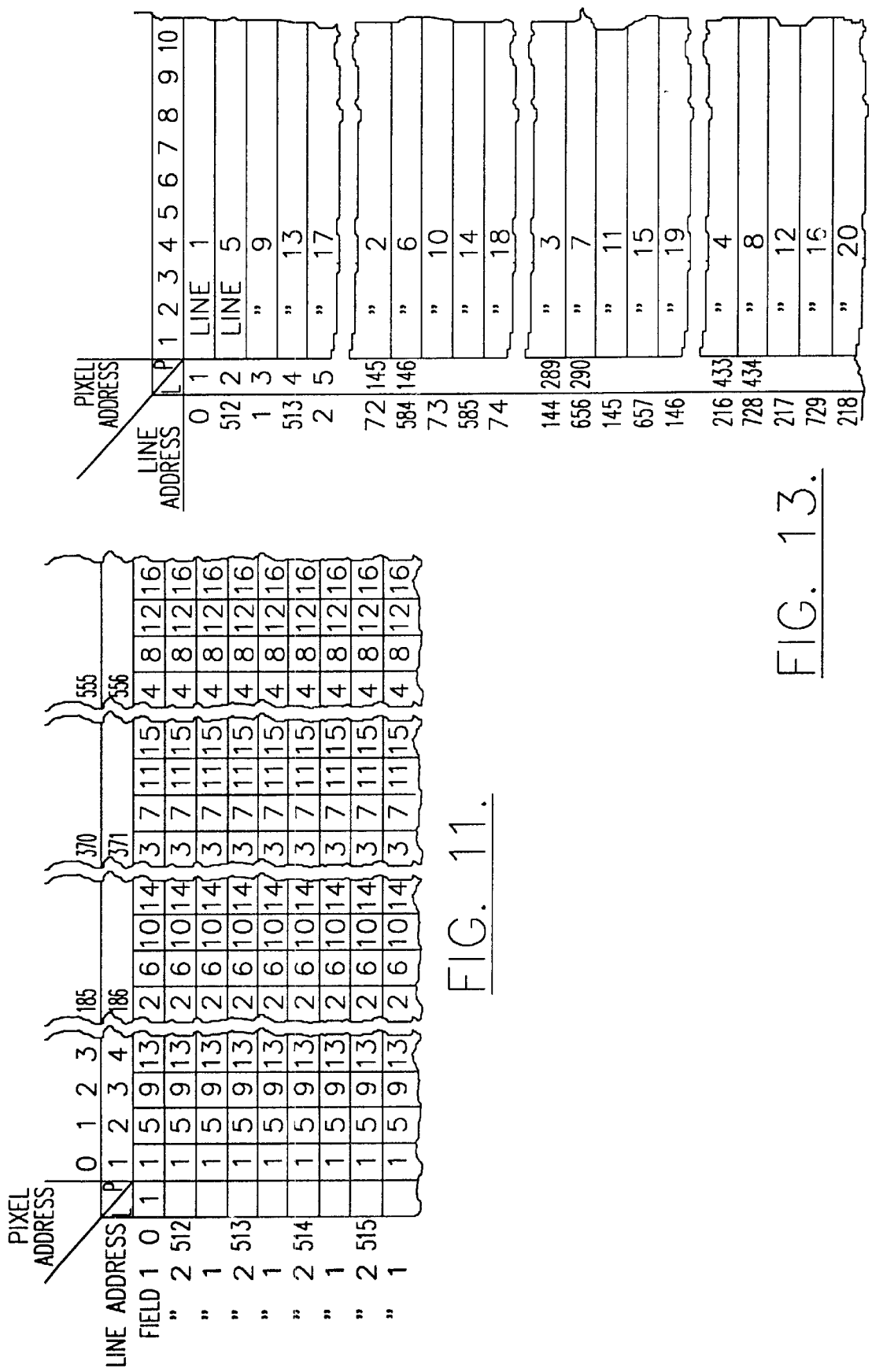

AUTOSTEREOSCOPIC VIDEO DEVICE

This application is a divisional of application Ser. No. 08/537,834, filed Jan. 11, 1996, now U.S. Pat. No. 5,719, 620, which is a 371 of PCT/FR94/26071, filed on Apr. 26, 1994.

FIELD OF THE INVENTION

The present invention relates to a single-camera autostereoscopic video device implementing an array of cylindrical lenses.

BACKGROUND OF THE INVENTION

U.S. Pat. No. 3,932,699 discloses an autostereoscopic picture-taking device having an array of lenses on which light rays from an object are focused, the lens array being placed against a window that is sensitive to light and constitutes part of a Vidicon tube, for example.

Such a picture-taking device suffers from numerous drawbacks, and in particular from considerable geometrical distortion and small depth of field.

A much more elaborate stereoscopic picture-taking device was proposed by McCormick et al. at the stereoscopic television colloquium that was held in London on Oct. 15, 1992. He proposed taking stereoscopic video pictures by recording an image that is projected onto a diffusing screen by two autocollimated lens arrays. That device suffers from the drawback of considerable complexity and in particular the use of three lens arrays that must be in perfect alignment otherwise the image is affected by extremely troublesome moiré phenomena.

In a first aspect, the present invention provides an autostereoscopic picture-taking device that does not suffer from the above-specified drawbacks, and more particularly a stereoscopic picture-taking device that is simple to implement and that-provides high optical quality.

French patent FR 1 362 617 (Yarmonkine) relates to a picture-taking device having a plurality of entrance objectives, specifically two lenses, each having its own optical axis, thus providing two entrance objectives with two optical axes corresponding to respective viewpoints. To obtain a composite image with interlacing, a frosted screen is placed on the plane face of the plate 7 and the screen is scanned horizontally by a normal camera. The screen gives rise to losses of light intensity and of contrast. In addition, given that the microlenses of the array 7 must have a field angle enabling them to see both objective lenses, certain light rays are very highly inclined relative to the optical axis, thus giving rise to problems of vignetting.

SUMMARY OF THE INVENTION

The idea on which the invention is based is to implement a single entrance objective, on a single optical axis, while still making it possible without a frosted screen to obtain an autostereoscopic image having two or more viewpoints. To this end, the invention provides a single-camera autostereoscopic picture-taking device implementing an array of cylindrical lenses, characterized in that it comprises in succession:

a) a single inlet objective having a single optical axis;

b) said lens array is disposed substantially in the image focal plane of the entrance objective, said array having a focal length such that for an image area equal to the pitch of the lenses making it up, the image of the entrance pupil of the entrance objective has a nominal width equal to said pitch;

c) a transfer optical system having magnification of less than unity; and d) an image sensor, the transfer optical system directing the light rays that emerge from the lens array onto the image sensor, the image of the lens array in the transfer optical system being such that the pitch of the lenses of the lens array corresponds therein to an integer number of image points (pixels) of the image sensor, and the image of the pupil of the entrance objective, in the absence of the lens array, being situated substantially at the pupil of the transfer optical system.

Because of its orthoscopic transfer optical system, this device makes it possible, in particular, to conserve a stereoscopic baseline corresponding to the inlet pupil diameter of the entrance objective, in spite of the reduction in the format of the image on the sensor. In addition, the picture-taking device of the invention uses only one lens array, which is particularly favorable for optical quality.

The image sensor may be a charge-coupled type of sensor, and it is preferably constituted by a set of three individual sensors associated with a prismatic three-color beam-splitter forming images on the three sensors, which images that are nominally in mutual alignment, image point by image point. This makes it possible to obtain a high degree of separation between viewpoints without having to subdivide the inlet pupil into as many sub-pupils.

Optimum separation between viewpoints is obtained by orienting the lens array in the line direction of the image sensor. It may be observed that this orientation corresponds to rotation through 90° relative to the normal position, given that the orientation of a lens array must be such as to provide horizontal separation between the viewpoints.

The entrance objective may include an inlet lens whose pupil is substantially equal to 100 mm.

The pitch of the lens array may be 0.4 mm.

The transfer optical system may advantageously have magnification that is substantially equal to 0.1.

The transfer optical system may have a circular diaphragm, in particular of the iris type. This diaphragm is equivalent to a diaphragm in the form of a horizontal slot disposed in the first objective, but it is much easier to position mechanically.

An autostereoscopic video system may include a picture-taking device as defined above.

In a first aspect, the invention also relates to a method of adjusting a device as defined above, characterized in that it comprises the following steps:

making a transcoded image of an autostereoscopic image, such a transcoded image comprising a plurality of anamorphosed flat images equal in number to the number of stereoscopic viewpoints; and adjusting the picture-taking device using said anamorphosed flat images, optionally using a diaphragm to black out at least one viewpoint.

In a second aspect, the invention relates to a method of transmitting and/or recording a stereoscopic image, in particular using a single camera and implemented by means of an array of cylindrical lenses.

The Applicant has observed that transmission via a transmission channel (transmitter, etc.) or direct recording of such images as obtained at the outlet of the CCD sensor 21 does not allow the images to be reproduced with satisfactory perception of relief.

The Applicant has been able to establish that the origin of this problem which occurs during image transfer is due to the fact that the relief information in the images is at high frequency, i.e. situated in the top portion of the video frequency band. Unfortunately, it is well known that video recorders, even of professional quality, tend to degrade this type of information. In addition, consumer video recorders have a video passband that barely exceeds 3 MHz for a nominal video passband of 5 MHz. Similarly, transmission channels (terrestrial broadcast networks or satellite broadcast networks or indeed cable networks) also present this type of degradation.

U.S. Pat. No. 3,674,921 (Goldsmith) discloses an analog transmission device for transmitting a stereoscopic video image that comprises two elementary images, namely a left image LE and a right image RE generated by two distinct cameras 21 and 23. They are thus not autostereoscopic images. Transmission is performed by conserving one of the two images and by extracting a high frequency difference signal which is subsequently filtered. For recording, use is made of two images that are anamorphosed on film. To pass into video mode, it is necessary initially to deanamorphose them by means of a deanamorphoser, and then to film them with a stereoscopic camera, after which the image is processed in conventional manner.

In a second aspect, the present invention relates to a transfer method, in particular for transmitting and/or recording autostereoscopic images, that makes it possible to use transmission channels or video recorders of standard type, while to a large extent conserving the quality of the stereoscopic images.

To this end, in the second aspect, the invention provides a method of transferring single camera autostereoscopic images obtained by means of an array of cylindrical lenses, characterized in that it includes a step of making a transcoded image of said autostereoscopic image, such a transcoded image comprising a plurality of flat images of anamorphosed format equal in number to the number of stereoscopic viewpoints, the flat images of anamorphosed format being placed side by side, the transcoded image being subjected to said transfer, i.e. to transmission and/or recording.

It will be observed that the method of the invention does not make use of anamorphosers or of deanamorphosers. On the contrary, the method consists in separating out the autostereoscopic image so as to recover flat images which normally present an anamorphosed format.

The image as transmitted or recorded consists merely in a series of flat images containing all of the information in the original image and which are themselves transmitted or recorded with the losses of quality imparted by conventional transmission channels and/or video recorders. However, on reception or playback, the autostereoscopic image as reconstituted by inverse transcoding turns out, surprisingly, to be very little affected by the defects of line transmission and/or of recording. During stereoscopic reproduction of the image, the stereoscopic information although situated outside the passband of the transmission channel of the recorder, will nevertheless have been conserved to a large extent.

The transcoded image may have the same format as the autostereoscopic image.

In a first embodiment, a recording step is performed using a standard analog video recorder (VHS, SVHS, etc.).

In a preferred embodiment, the transfer step is implemented using a digital technique, e.g. on a satellite channel and/or a digital video recorder, with a bit rate compression algorithm being applied. According to the invention, the above considerations are equally applicable to any digital processing of the image. Separation of the image into a plurality of flat images of anamorphosed format and containing all of the information in the original image makes it possible to simplify considerably any bit rate compression processing, given that the high frequency components of the image comprising the stereoscopic information are ipso facto eliminated to a large extent. The compression algorithm may, in particular, be a vectorization algorithm as known per se. Numerous types of algorithm are known for compressing images and in general they implement the discrete cosine transform DCT whether the images are in traditional television standards or in so-called "high definition" standards.

For the transcoding step, the transmission or recording of images according to the invention may comprise a first step of digitizing the autostereoscopic image, a second step of storing the transcoded image, said transcoding being performed by a transcoding memory making it possible to perform write addressing in at least one memory, and a third step of reading said memory.

The transformation step may include a fourth step of analog conversion of the transcoded image for the purpose of analog transmission or recording thereof.

Said memory may be a pixel transcoding memory, with transcoding being performed by permutation of the pixels in each line. The capacity of the memory may then be limited to a single line or to certain lines only.

In a preferred embodiment, the transcoding memory is such that an interlace-scan image is transformed into a flat anamorphosed image with progressive [i.e. non-interlaced] scanning. As a result, relief is perceived in greater comfort, in particular when the lines of the stereoscopic image are vertical, in which case, because of the vertical scanning of the original image, the viewpoints of the stereoscopic image blank out in alternation.

The third step of reading can advantageously be performed at twice the rate of the autostereoscopic image.

In a preferred embodiment, the transformation operations are performed by direct transcoding in the image sensor of the camera, which sensor is provided with a transcoding matrix, the matrix being preferably disposed between the columns of image points (or pixels) and a line shift register.

In a second aspect, the invention also provides a stereoscopic image transfer system characterized in that it comprises:

a device for generating autostereoscopic images;

a first transcoding device for making a transcoded image of said autostereoscopic image, such a transcoded image comprising a plurality of flat images of anamorphosed format in equal number to the number of stereoscopic viewpoints, the flat images of anamorphosed format being placed side by side;

an image transfer device; and a second transcoding device for implementing a transcoding operation that is the inverse of that implemented by the first transcoding device so as to reconstitute the autostereoscopic images.

In a third aspect, the invention relates to a stereoscopic image video projector comprising a plurality of video projectors, each of which projects an elementary image representing one of the viewpoints of said stereoscopic images.

A stereoscopic video projector is known from the article by Chin Hasegawa et al., entitled "Three-dimensional image technology" published on Jul. 25, 1991 in the proceedings of TEC 1991 (Tokyo, Japan).

It comprises a first array of cylindrical lenses upstream from a diffusing screen, and a second array of cylindrical lenses downstream from the diffusing screen.

Each cylindrical lens of the first lens array corresponds to a number of vertical lines equal to the number of viewpoints of the stereoscopic image. Such an image as formed in this way on the diffusing (frosted) screen is transferred in conventional manner by the second array.

The arrays have a pitch equal to n times the size of a pixel, where n is the number of viewpoints. A drawback is that because of its large pitch, the array disposed downstream from the diffusing screen is very visible, and in addition it is difficult to avoid the presence of very disagreeable moiré patterns.

In a third aspect, the invention provides projection apparatus that avoids the above-mentioned drawback.

According to the third aspect, the invention provides stereoscopic image projection apparatus of the above-specified type, characterized in that the first and second cylindrical arrays are at a pitch that is less than or equal to half the size of an image point or pixel on the screen, and in that the pitch of the second cylindrical array is equal or slightly less than the pitch of the first cylindrical array.

As a result, the highest frequency of the image is associated with the array and is significantly higher than the initial pixel frequency, and, when at the selected nominal observation distance, the spectator sees with each eye and through the first lens array, only a single viewpoint (without moiré fringes).

The first cylindrical array may be a parallax barrier or a lens array.

In a preferred embodiment, the arrays may have a focal length and a pitch such that a spectator placed at a given nominal distance from the screen sees a solid color (i.e. without moiré fringes).

The projection apparatus of the invention may comprise a conversion device for transforming a transcoded image comprising a plurality of flat images of anamorphosed format equal in number to the number of viewpoints and disposed side by side into a plurality of said deanamorphosed elementary images, and in that the conversion device has outlets for said elementary images, which outlets are coupled to respective inlets of video projectors. In a preferred embodiment, the conversion device may include an interpolator device such that the flat images are deanamorphosed with interposition of intermediate pixels, e.g. calculated by interpolation, so as to increase the resolution of the image.

An autostereoscopic video system may incorporate image projection apparatus such as that defined above. It is characterized in that it comprises:

a device for generating autostereoscopic images;

an image transcoding device for transcoding the autostereoscopic images into a plurality of elementary images and for deanamorphosing them; and projection apparatus.

BRIEF DESCRIPTION OF THE DRAWINGS

Other characteristics and advantages of the invention appear better on reading the following description given by way of non-limiting example and with reference to the drawings, in which:

FIG. 1 shows a prior art picture-taking device from U.S. Pat. No. 3,932,699;

FIG. 2 shows a picture-taking device made in accordance with the above-mentioned McCormick article;

FIG. 3a shows a picture-taking device of the invention, and

FIGS. 3b and 3c show a preferred embodiment of the invention;

FIG. 4 is a general block diagram of an image transcoding device enabling a large number of different transcodings to be performed;

FIG. 5 shows the addressing of the image memory from a transcoding line memory of a transcoding pixel memory in the case of an interlaced image;

FIG. 6 shows the case of a progressive image;

FIG. 7 shows a transcoding module suitable for an input of 25 interlaced images and an output of 25 interlaced images;

FIG. 8 shows a transcoding module corresponding to an input of 25 interlaced images and an output of 50 progressive images with processing on the pixel image points;

FIG. 9 shows a transcoding module suitable for an input of 25 interlaced images and an output of 25 interlaced images with processing by line;

FIG. 10 shows a transcoding module suitable for processing an input of 25 interlaced images and an output of 50 progressive images with processing by line;

FIG. 11 shows an addressing table for pixel lines corresponding to an n=4 image mode with addressing by pixels in interlaced images;

FIG. 13 is a table showing an N image mode in lines with a pitch of 4 in interlaced mode;

FIG. 15 is a table illustrating an N image mode in lines with a pitch of 4 and in progressive mode;

FIG. 16 is an addressing table for a transcoding line memory corresponding to FIG. 15;

FIG. 17 is a table corresponding to an inlet for N image mode in pixels at a pitch of 4 and with an outlet in relief mode for the same circumstances, to provide an output with inverted relief;

FIG. 18 is an addressing table for a transcoding pixel memory to obtain a relief mode from an N image mode input with an output in interlaced mode or in progressive mode;

FIG. 19 is a table showing an input mode of N images in lines with an interlaced output in relief mode at a pitch N=4;

FIG. 21 is an addressing table for a transcoding line memory with an input in N image mode and an output in relief mode for a progressive type image, in particular at 50 images per second;

DETAILED DESCRIPTION

Figure 14:
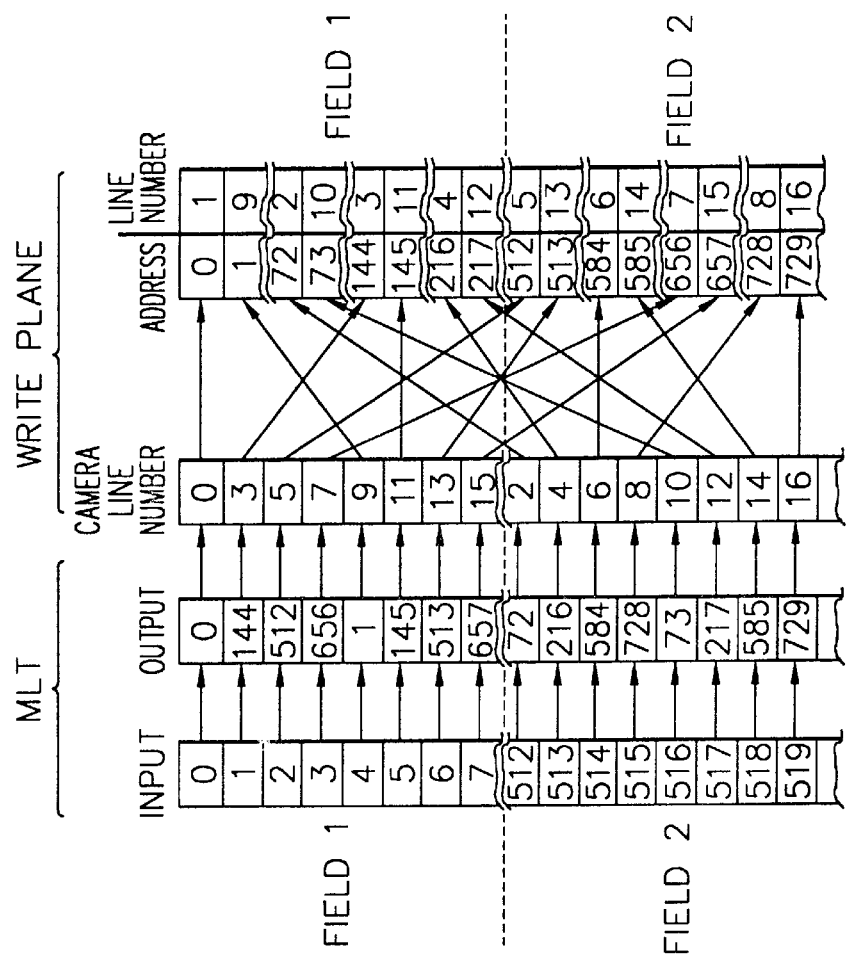
FIG. 14 shows a transcoding line memory corresponding to FIG. 13.

As shown in the above analysis of the prior art, there are at present two main ways of obtaining autostereoscopic images, one of which (U.S. Pat. No. 3,932,699) implements a lens array adjacent to a video camera, and the other of which is much more elaborate and projects an image filmed by a conventional video camera onto a diffusing screen.

In FIG. 1, a picture-taking device of U.S. Pat. No. 3,932,699 comprises a camera 10 which is associated with an objective 9 having a mean plane 9'. A point 2 of an object 1 to be displayed emits rays 3 and 4 that are received by the full aperture of the lens 9. In the same manner, each point 9" receives light from all of the points of the object 1 (extreme received and re-emitted rays 5 and 6). The lens 9 is a converging lens placed in front of a radiation-sensitive surface 8 of the camera 10. The camera may be a Vidicon tube receiver, for example. A dispersing element 7, in particular a lens array adjacent to the photosensitive element makes it possible to achieve a plurality of elementary images of the scene to be filmed in a manner that is spatially repetitive, thereby enabling the camera 10 to transmit stereoscopic image information. The inlet surface of each elementary lens making up the lens array 7 is cylindrical in section about a vertical axis, while the outlet surface of each lens element is plane. As mentioned above, this picture-taking device presents major geometrical aberrations because of the need for the optical system to have a very large aperture in order to conserve an adequate stereoscopic baseline. In addition, a lens array having the dimensions of a standard video sensor is very difficult to make, particularly since its focal length must be very short (of the order of 100 microns, which is almost incompatible with any practical implementation).

The stereoscopic television system proposed by McCormick et al. at the colloquium on stereoscopic television (London, Oct. 15, 1992) and which is summarized in the article "Restricted parallax images for 3D TV" takes pictures in the manner shown in FIG. 2. It comprises an autocollimating transmission screen 12 having two adjacent arrays of cylindrical lenses 11 and 13, and a lens L' at whose focus there is placed a screen that is made up of a third array of cylindrical lenses 14 and a frosted screen 15. The stereoscopic image formed on the frosted screen 15 is transferred by an optical system 16 and projected in reduced form onto the sensitive portion 18 of a detector 19, e.g. a Vidicon tube. The concept of that system is to use a video camera (16, 18, 19) to take a picture in conventional manner of an image projected on a screen. That picture-taking device is very complicated since it uses at least three arrays of cylindrical lenses which must be accurately positioned-geometrically relative to one another, and it also uses projection onto a diffusing screen, thus giving rise to losses of light efficiency, of resolution, and of contrast. Such a device is also sensitive to mechanical vibration and to temperature variation, both of which phenomena are liable to give rise very quickly to moiré patterns that are most disagreeable in appearance and that considerably degrade the stereoscopic information.

FIGS. 3a to 3c describe a picture-taking device of the invention. It comprises the following elements:

1) An entrance objective that is preferably telecentric, comprising an inlet lens $L_1$ and an outlet lens $L_2$ whose focus $F_2$, in a telecentric system, coincides with the optical center $O_1$ of the lens $L_1$. Such an entrance objective is known per se from European patent application EP-A-084998 (CNRS). When an optical system is telecentric, the image of the central point of the inlet pupil of the lens $L_1$ is sent to infinity by the lens $L_2$, thereby giving rise to parallelism making it possible to engage the lens array in favorable manner. In particular, the two lenses $L_1$ and $L_2$ may be conjugate, i.e. the focus $F_1$ of the lens $L_1$ may also coincide with the optical center $O_2$ of the lens $L_2$. By way of example, the objective $L_1$ may have a focal length of 200 mm and an aperture of f/2, which corresponds to a working pupil diameter of 100 mm, which distance constitutes the available stereoscopic baseline for taking pictures. This value which is significantly greater than the spacing between the eyes of an observer (or inter-pupil distance, which is about 65 mm), is particularly favorable for achieving realistic stereoscopic perspective after projection on a screen.

2) A lens array having an area of about 70 mm×90 mm made up of elementary lenses disposed vertically and having a pitch p of 0.4 mm and disposed substantially in the focal plane of the entrance objective (in practice very slightly downstream therefrom). Each of the elementary lenses has a focal length such that, for an image area equal to the pitch p of a microlens, i.e. 0.4 mm wide, the image of the pupil of the objective $F_1$ formed through each of the elementary lenses is exactly 0.4 mm. This makes it possible for all of the pupil images formed by each elementary lens (or microlens) to touch one anther exactly. It may be observed that since the array 20 is made up of cylindrical type lenses, the dimensions of pupil images are naturally to be considered in the horizontal plane.

3) A transfer optical system which is preferably orthoscopic, i.e. which does not induce vertical line deformations, and possibly comprising a field lens $L_3$ positioned downstream from the lens array 20 to send all of the light rays from the array 20 towards an image transfer objective $L_4$. The objective $L_4$, e.g. having a focal length of 25 mm, is mounted on a camera 22 provided with charge-coupled sensors. This transfer optical system $L_3$, $L_4$ forms a real image 21 of the lens array 20 immediately upstream from the sensors of the camera 22. The magnification of the transfer optical system $L_3$, $L_4$ is selected so that rays emerging from the lens array 20 are sent to the camera 22 under conditions such that the image 21 has a pitch p' corresponding to an integer number of image points (pixels) of the image sensor 22. In addition, the distance between the image 21 and the image sensor 22 is such that focusing takes place on the sensor(s) of the camera 22.

The elements of the entrance objective and of the transfer optical system are disposed in such a manner that in the absence of the lens array, the image of the pupil of the entrance objective coincides substantially with the pupil of the transfer optical system. This condition ensures, in particular, that when the entrance objective is not telecentric, the transfer optical system restores parallelism in a manner described below.

In particular, the sensor 22 integrated in the camera 27 may include three charge-coupled sensors 24, 25, and 26 mounted on a prismatic three-color beam-splitter 23, which sensors are accurately aligned so that the first pixel of the first line coincides for each sensor, and in general, so that the images of the three sensors 24, 25, and 26 are thus in alignment pixel by pixel.

The signal from the camera 27 may be applied to a video recorder 40' or to a video monitor 40 that has been adapted in known manner for displaying autostereoscopic images, or else it may be delivered to a transmitter 41' so as to be received by receivers 42'.

EXAMPLE

A lens array 20 having a pitch of 0.4 mm and a focal length of 1.66 mm was disposed 20 mm from the optical center of $L_2$ and at 90 mm from the optical center of $L_3$. The lens $L_1$ was constituted by a doublet $L'_1$, $L'_2$. Its pupil is written $P_1$.

$L_1$ focal length $f_1$=200 mm $L_2$ focal length $f_2$=300 mm $L_3$ focal length $f_3$=230 mm $L_4$ focal length $f_4$=25 mm distance $O_1O_2$ between the optical centers of the lenses $L_1$ and $L_2$: $O_1O_2$=180 mm distance $O_2O_3$ between the optical centers of the lenses $L_2$ and $L_3$: $O_2O_3$=110 mm distance $O_3O_4$ between the optical centers of the lenses $L_3$ and $L_4$: $O_3O_4$=245 mm.

The system of the invention is particularly advantageous for the following reasons.

To implement a three-dimensional picture taking unit, it is necessary for the system to enable a scene to be observed from different viewpoints, there being two or more viewpoints, and for each viewpoint to be sufficiently far from the preceding viewpoint for there to be a considerable difference (or disparity) between the views. When the picture is taken using a single objective, and without moving these component elements in the plane parallel to the image plane, all of the relative displacement of the axes of the viewpoints must be contained within the horizontal diameter of the pupil of the objective which thus constitutes the total available stereoscopic baseline. In the example described above, the total stereoscopic baseline, or working horizontal diameter of the pupil is equal to 100 mm, i.e. it is greater than the distance between the pupils of an adult human (about 65 mm). In order to obtain a stereoscopic baseline of 10 cm with an objective that does not have significant defects, and for the perspective of the filmed scene to be no different from that perceived by an observer, it has been discovered experimentally that a ratio of about 2 between the focal length and the working horizontal diameter of the pupil gives the looked-for results. This has led, in the above example, to using an objective having a lens $L_1$ with a focal length of 200 mm for an aperture f/2.

The focal length should not be considered as such, since account must be taken of the dimensions of the sensitive surface used. For a standard tri-CCD camera provided with sensors forming a target of about 8.8 mm×6.6 mm, this focal length defines a very narrow object field, and indeed one that is less than one-tenth of the field (about 160 mm) provided by the "standard" focal length for such a surface (i.e. about 16 mm). The solution to this problem of reconciling an appropriate stereoscopic baseline with a standard focal length is to separate these two incompatible requirements by using an intermediate first image plane having an area that is ten times greater, for example. This area is physically embodied by a lens array having a working area of 80 mm×60 mm. This image is transferred by a second objective having a short focal length, e.g. 25 mm mounted on the camera so as to make the image it forms of the array coincide with the CCD charge-coupled sensors. Once the stereoscopic baseline has performed its function in forming the image on the array of vertical cylindrical lenses, it is possible to reduce the image by transferring it in air while conserving the angle of the object field.

More particularly, by using simultaneously both the objective $L_1$, $L_2$ which is preferably telecentric, and the transfer device $L_3$, $L_4$, it is possible to reduce the dimensions by a factor of about 10 in the present example, since the working area of the first image plane is about 60 mm×80 mm. Since the lens array 20 is disposed substantially at the first image plane of the optical system $L_1$, $L_2$, this makes it possible to conserve the benefit of the 10 cm stereoscopic baseline in spite of the reduction of the image format on the sensor 22. The use of an initial area of 60 mm×80 mm makes it possible to combine both the field which is little greater than the standard focal length for this format (160 mm) and the large stereoscopic baseline which is equal to 10 cm.

Another advantage of the invention consists in greater ease of manufacture and of positioning of the lens array 20. It is much easier to manufacture one array, particularly when its pitch is 0.4 mm, than it is to manufacture three arrays at a pitch of 0.04 mm. It would also be extremely difficult to position three microarrays in the three CCD sensors while ensuring exact superposition of the three color images (red, green, blue) obtained in this way taking account simultaneously of the parallelism of the microlenses and of the image planes, and of the pitch and the phase of the lenses, while nevertheless conserving the functionality and the cleanness of the sensors. That could only be done by a manufacturer of camera sensors. By transferring the image in air in accordance with the invention it becomes possible to use a single array that is easily adjustable and removable, should total compatibility of equipment be desired (between taking pictures in relief and equipment as used today).

The picture-taking device of the invention makes it possible firstly to use a single array 20 for all three colors, and secondly for this array to be of large dimensions, thereby making it easier to manufacture and to position with the desired accuracy. This avoids the drawbacks both of FIG. 1 (small sized array difficult to position in the sensor, and in any event not avoiding the geometrical distortions inherent to that geometry), and of FIG. 2 (large number of lens arrays which are practically impossible to keep in alignment except under very severe experimental conditions).

In a preferred embodiment, the second objective $L_3$, $L_4$ for transferring the image has an iris diaphragm. Such a diaphragm is equivalent to a diaphragm in the form of a horizontal slot in the first objective $L_1$, $L_2$, but it is easier to position since the only parameter is the centering thereof. The centered iris diaphragm of the second objective is equivalent to a diaphragm in the form of a horizontal slot in the first objective. Since the array used is of the vertical cylinder type, the light rays emerging from the first pupil are not disturbed in the direction parallel to the axis of the microlenses, whereas in the horizontal direction, these rays are definitively tied to the images of the pupil as obtained by each microlens. The images of the pupil cannot be affected by reducing the size of the pupil in the second objective.

Because the sensors 24, 25, and 26 of the camera operate in discrete manner, it is possible to avoid dividing the pupil into as many sub-pupils as there are selected viewpoints.

While the image is being transferred, the image of the array 20 is positioned in such a manner that each image of each lens (or microimage of the pupil) is formed on an integer number of image points (or pixels) equal to the number of viewpoints. The discrete nature of the sensitive surface of CCD sensors gives rise to the first pupil of the system being rendered discrete by the reversibility of light paths. Because the microimages of pupil No. 1 that are formed at the location of the lens array (in the manner of a continuum) are projected onto a structure that is discrete not only in space but also with respect to energy, it is possible to subdivide the pupil into distinct geographical zones that are equal in number and in relative disposition to the pixels put into exact correspondence with the lenses of the array. In the above example, each microlens image is formed horizontally on four pixels, thereby subdividing the main pupil into four equal zones separated by portions that are made blind because they correspond to the inter-pixel gaps of CCD sensors. The horizontal structure of the selected sensitive surface determines the resulting structure of the pupil available for taking pictures in relief and consequently determines the means for processing the image obtained in this way. The fact of using four pixels per microlens leads to four viewpoints being filmed simultaneously (one viewpoint per sub-pupil). Electronic processing of the image becomes possible because the processing is performed on the smallest entity of the resulting composite image: the pixel, thus giving rise to excellent separation between the viewpoints. Permutation of pixels in columns defined by the edges of the images of the microlenses corresponds to permutation of the positions of the above-described sub-pupils.

Even better stereoscopic separation can be obtained by having the direction of the lines of the sensor 22 parallel to the axes of the lenses in the lens array 20. The separation between adjacent image points belonging to different lines is greater than that between adjacent image points belonging to the same line. This corresponds to positioning that is at 900 compared with ordinary conditions (vertical line scanning), but if so desired, that can be reestablished by appropriate electronic processing.

When the image from the tri-CCD camera is processed at pixel frequency or at line frequency (depending on the direction in which it is desired to film a scene in three dimensions) in the mode referred to as "N image mode" (in columns or lines), the image is recomposed in real time in such a manner that on the receiver there appears an image that is cut up into four vertical portions (when processing with a pitch of four) each containing one viewpoint. Pixel No. 1 remains in place, No. 2 becomes No. 1 for the second viewpoint, No. 3 becomes No. 1 for the third viewpoint, and No. 4 becomes No. 1 for the fourth viewpoint. No. 5 becomes pixel No. 2 of the first viewpoint and so on modulo 4.

This implies that when the viewpoint No. 1 is being observed, only one pixel in four of the initial image is being observed. For viewpoint No. 1, the numbers of consecutive pixels in the first line correspond to 1, 5, 9, 13, 17, 21, 25, 29, 33, 37, 41, etc. . . . up to the end of the working line. For the second line, the sequence beings again identically and so on for the entire image. The total width of a viewpoint is equal to one-fourth of the screen, and the viewpoint is represented by a flat image of the filmed scene which is compressed in the horizontal direction, i.e. a flat image of anamorphosed format for each of the four viewpoints. The connection between the pixels of CCD sensors, the microlenses situated in the first image plane, and the sub-pupils of the main objective has been shown above. It can be seen that the viewpoint as reconstructed in this way corresponds exactly to one of the four sub-pupils (assuming a setting of four pixels per microlens).

When, by means of a diaphragm positioned in the main objective, the optical path corresponding to one of the sub-pupils is interrupted, the corresponding viewpoint on the display screen disappears. If the lens array of the camera system is observed, it can be seen that light then illuminates no more than three-fourths of each microlens, and if the CCD sensor could be observed directly, it would be seen that one pixel in four was receiving no light.

Thus, the slightest error in positioning the camera relative to the array gives rise to defects that are perfectly identifiable and reproducible in the correspondence between the array and the sensors of the camera. Such projection errors give rise to darkening defects of viewpoints in the N image mode associated with a partial diaphragm at the location of the sub-pupils. Without this mode of processing, it would be necessary to identify darkening defects on one pixel out of four and to be capable of identifying the portions of the screen where the dark pixel no longer belongs to the same series. Adjustment defects give rise to non-orthoscopic projection of the array and the resulting moiré shapes are highly changeable, giving rise to moiré patterns of increasing size as the lens frequency comes close to the pixel frequency divided by four (assuming only the magnification of the projection is not perfect), to trapezium shapes or to moiré patterns that are curved at progressive frequencies. N image mode makes it possible to magnify the phenomenon about 200 times, so defects are observable on the scale of one-fourth of the screen rather than on pixel scale. Adjustment accuracy and repeatability becomes accessible without inspection apparatus of the kind to be found in optical laboratories. Once experience has been gained, it is easy to associate a correction in the positioning of the camera in three dimension by means of micrometer screws with defects observed macroscopically in each viewpoint by this method, so as to obtain a good spatial distribution of viewpoints on display and/or on recording. Errors of this kind cannot be put right subsequently.

In FIG. 4, a transcoding module comprises: an input module ME having an analog-to-digital converter ADC, and a synchronization and phase-locked loop circuit BVP/SYN; a control module MC including an interface operator INT, a microprocessor MP, and a databank DB; a digital module MD having a circuit GSE for generating write address signals, a circuit GSL for generating read address signals, a transcoding line memory MLT, a transcoding pixel memory MPT, a first image memory MI1, and a second image memory MI2; and an output module comprising a circuit GSS for generating output synchronization signals, a digital-to-analog converter DAC, and/or a module DT for generating video digital images on an input bus DV. The digital output of the circuit DT or the analog outputs of the converter DAC make it possible to obtain a transcoded image 30 comprising a plurality (in this case four) flat images 31 to 34 of anamorphosed format that are disposed side by side. Each flat image contains all of the information for a single stereoscopic viewpoint. Its height is equal to a normal image, and its width is equal to one-fourth the width of a normal image.

For color images, the converter circuits ADC and DAC operate in three times 8-bit mode, i.e. with a definition of 8 bits for each of the three colors. The line memories or transcoding pixel memories (MLT, MPT) serve to perform write addressing, and the read and write signal generators GSL and GSE communicate via 10-bit buses.

The digital module MD performs all of the processing required for implementing the algorithm specific to the selected mode (N anamorphosed images, relief mode) with output that is interlaced or progressive.

By way of example, the ADC converter circuit may be a triple BT 253 converter (Brooktree), the DAC converter circuit may be a triple BT 473 converter (Brooktree). The synchronization extractor SYN may be an LM 1881 circuit (National Semiconductor) operating directly on video signals by extracting composite synchronization therefrom. The phase-locked loop BVP may be a 74HC4046 circuit (Motorola).

Write address signal generation GSE may be integrated in a programmable logic circuit. The same applies to read address signal generation in the circuit GSL. The microprocessor MP is also programmable to perform other functions such as freezing an image, or freezing an image color by color.

The image memories $MI_1$, and $MI_2$ constitute image planes that alternate in writing and reading at the end of each image coming from the CCD camera. For each color, each image memory $MI_1$, $MI_2$ can accept 1024 lines of 1024 pixels, for example, and given that there are three colors, that corresponds to 3 megabytes for each memory.

Under such circumstances, 20 address bits are used to access all of the pixels in a plane.

Whether for reading or writing, the address generators or counters are made up as follows:

the 10 least significant bits represent the position of an image point or pixel along a line, and the 10 most significant bits represent the position of the line in the image (line number).

The counters provide a linear value starting at zero and incrementing regularly up to the programmed maximum value corresponding to the selected video standard.

All of the image processing performed in the context of the invention relies on permutations of pixels and/or lines in application of an algorithm that is specific to the selected mode.

Given that such algorithms are practically impossible to compute in real time (less than 70 ns), the switchovers or permutations are precalculated and are held in the data bank DB of the control module MC. This data bank DB serves to load one or other of the memories MLT and MPT which are placed as buffers between the image memories ($MI_1$, $MI_2$) and the outputs from the address generators.

Thus, for each address coming from the write counter, a new address is issued enabling the pixel or the line coming from the camera to be written into any location in image plane $MI_1$, or $MI_2$. This is implemented by using a transcoding memory MLT or MPT.

Each address block of said bit leaving the counters is associated with a transcoding memory MLT or MPT to a depth of 1024 times 10 bits. The outputs from these memories constitute new 20-bit addresses which are connected directly to the memories $MI_1$ and $MI_2$ while writing. A special feature of these memories is that they are very fast (response time less than 20 nanoseconds).

The 10 bits of the pixel address CP (see FIGS. 5 and 6) are incremented by the clock at the frequency of 14.1875 MHz of the synchronizing and phase locking circuit BVP/SYN. This frequency is tuned to the internal clock of the CCD camera.

The 10 line address bits CL are incremented by line synchronization coming from the circuit BVP/SYN.

The pixel transcoding memory MPT is always addressed with a 10-bit counter and is therefore seen as a single block running from 0 to 1023, whatever the mode, whether: in relief; N image; interlaced outputs; or progressive outputs.

The line transcoding memory MLT is split into two portions, i.e. addresses 0 to 511 for the first field including the odd lines of the image in interlaced mode coming from the CCD camera, and addresses 512 to 1023 for the second field that comprises the even lines of the image. The address is obtained by a 10-bit counter CL whose tenth bit is constituted by the field parity signal PTR (see FIGS. 5 and 6).

For an output in interlaced mode (FIG. 5), the image memories $MI_1$, and $MI_2$ are also subdivided into two blocks each, with the transcoding algorithm being such as to make it possible during reading to find odd lines corresponding to the first field (field 1 to be displayed) in the first block, and even lines corresponding to the second field (field 2 to be displayed) in the second block. Under such circumstances, the organization is as follows. The first field has addresses 0 to 511 Kbytes and the second field has addresses between 512 Kbytes and 1023 Kbytes (1 Kbyte =1024 bytes).

For all modes with progressive outputs (50 images/s), (FIG. 6), the image memories $MI_1$ and $MI_2$ are each constituted as a single block, reading finding the lines to be displayed in the first 576 Kbytes of the image plane.

This organization has the advantage that, since the transcoding memory is split into two by the tenth bit (or parity bit) that does not belong to a counter, image memory $MI_1$ or $MI_2$ is split into two for interlaced output merely by the contents of information in the line transcoding memory MLT. This organization facilitates the programming of algorithms.

In addition, transcoding is performed at write time for reasons of speed, it being understood that reading may take place at twice the frequency when providing progressive output. This architecture therefore makes it possible to take best account of all possible cases.

It will be understood that if it is not desired to provide an output in progressive mode, then transcoding could be performed while reading, or part of it could be performed while writing and another part while reading.

The input module M3 serves to digitize the levels of the analog signals that represent the colors of each image point or pixel. The digitizing frequency is close to 14 MHz and the resolution for each color is 8 bits. The analog-to-digital converter ADC programmed by the control module MC enables gain and black level for each color to be adjusted, with the clamping circuits for each color being incorporated in known manner in the converter (it is recalled that with standardized television transmission, e.g. SECAM, PAL, or NTSC, this is done by using levels given at the beginning of each line).

The synchronization extractor SYN and the phase-locked loop BVP may be integrated in a single component. It may be observed that the component may be selected from those that present jitter remaining within very small limits (less than 5 nanoseconds).

This quality makes it possible to obtain an image point or pixel of the same size at the beginning and at the end of a line.

In addition, the frequency of the phase-locked loop BVP is selected to be identical to the sampling frequency of the camera. This makes it possible to ensure that no original pixel is repeated twice or is lost. Accurate latching onto image points or pixels is very important when providing images in relief, since any offset can give rise to complete or partial loss of the perception of relief.

To make implementation simple, the frequency of the phase-locked loop BVP is doubled so as to make it possible to double the speed of image reading for all operating modes when using progressive output. A divide-by-two bistable thus provides a pixel clock for writing. This bistable is reset to zero on each line to eliminate a 1-pixel shift on display that would arise each time the apparatus is switched on.

The output module MS serves to play back the color image that has been processed, either in analog form (converter DAC) or in digital form (module DT and output bus DV). The playback frequency is either the digitizing frequency or twice that frequency, giving a maximum of 30 MHz with 8-bit resolution per color.

The digital-to-analog converter DAC combines several functions, in particular the function of synchronization mixing, and the function of color adjustment, in a manner that is known per se.

The logic circuit GSS for generating output synchronization is practically transparent in all interlaced output modes. The original synchronization signals coming from the phase-locked loop BVP are put through directly to the output.

In progressive output modes, the logic circuit uses the original synchronization to recreate synthetic synchronization signals for televisions and monitors that accept scanning speeds that are twice those provided by the input camera (50 images per second or 60 images per second). The main advantage of scanning at twice the speed is to eliminate the flicker which can sometimes be seen on present-day standards, with the flicker phenomenon being made worse by the process of providing television in relief. This logic circuit is integrated in programmable logic circuits.

The control module MC makes it possible to program the adjustment of black level clamping for the input signals, to configure the programmable logic circuits of the digital module as a function of the selected mode, to configure the programmable logic circuit of the synchronization synthesizer GSS depending on the selected mode, to correct output colors by means of tables integrated in the digital-to-analog converter DAC, and in general to perform auxiliary functions via an interface INT.

The data bank DB contains all of the information to be copied into the line and pixel transcoding memories MLT and MPT for pitches 1 to 8 (i.e. for numbers of viewpoints lying in the range 1 to 8), and for all the modes that are described below.

It also contains data enabling the programmable logic circuits of the synchronization synthesizer GSS, of the write signal generator GSE, and of the read signal generator GSL to be reinitialized as a function of the algorithms and the output modes selected by the operator.

The operator interface INT includes a liquid crystal display screen and a keyboard, and it is connected to the system, e.g. via a synchronous serial link of the "I2C BUS" type from Philips.

It is also possible to replace the operator interface INT by an external computer which optionally makes it possible to load the read/write transcoding memories with algorithms that were not initially provided in the apparatus.

In the description below, each of its modes is analyzed on the basis of three graphical representations, as follows:

a representation of the screen after processing;

a table showing the action of the transcoding memory; and a summary of the hardware elements and of the signals involved.

For the tables representing the action of the transcoding memory, MLT or MPT, the following are identified on the basis of the input standard (normal stereoscopic image or in "N image" mode, i.e. corresponding to a plurality of flat images of anamorphosed format disposed side by side):

transcoding mode (relief mode or N image mode, e.g. for output to the video recorder 46); and output standard (interlaced mode and/or progressive mode).

It should be observed that the Applicant's U.S. Pat. No. 5,099,320 issued on Mar. 24, 1992 describes how to obtain an image in relief mode from cylindrical lenses that provide an image in inverted relief. That patent describes in particular the address permutations which make it possible to obtain an image in true relief.

FIG. 7 shows a transcoding module corresponding to FIG. 4, but which shows only the elements required for transcoding between an input image made up of interlaced images at 25 images per second, and an output image made up of interlaced images at 25 images per second, and on which "pixel mode" processing is performed. Pixel mode is defined as a mode having horizontal line scanning and in which information in relief is processed by permutation of pixels within a line, without permutation between the lines.

As described above, the circuit BVP/SYN receives in known manner a composite synchronization signal SYNC at low level from the analog-to-digital converter ADC, and at its output it delivers a line synchronization signal SYNL, a field parity signal PTR, and a pixel clock signal at twice the frequency of the frequency corresponding to 25 images per second, said signal having its frequency divided by two by the frequency divider $D_1$ which is reset to zero at the beginning of each line by the signal SYNL. The pixel clock signal HLP provided at the output from the divide-by-two circuit $D_1$ is applied firstly to the clock input of the digital-to-analog converter DAC, and secondly to the count input H of a pixel precounter PCP which is reset to zero at the beginning of each line by the signal SYNL, and finally to one of the inputs of an AND gate $E_1$ whose other input receives the output from the pixel precounter PCP, the output of the AND gate being applied to the count input H of a working pixel counter CPI which is likewise reset to zero at the beginning of each line by the signal SYNL.

The field parity signal PTR is divided by two by a divider $D_2$ so as to interchange the write and read operations between the image memories $MI_1$, and $MI_2$ for each image. In other words, the images provided by the camera are recorded first one in the memory $MI_1$, then the next in the memory $MI_2$, then the next again in the memory $MI_1$, and so on. This facilitates reading since the memory $MI_1$ is read during the time while the memory $MI_2$ is being written, and vice versa.

The field parity signal is also supplied to the 10-bit control bus for the plane addresses of the image memories $MI_1$ and $MI_2$ so as to identify the sector within said memories that corresponds to one or other of the fields of an image.

For line counting, the synchronization signal SYNL is supplied to a line precounter PCL which is reset to zero by a field synchronization signal SYNT supplied by the synchronization circuit SYN that is integrated with the phase-locked lock BVP. The signal SYNL and the output signal from the line precounter are applied to the inputs of an AND gate E2 whose output is applied to the count input H of a working line counter CLU which is reset to zero by the field synchronization signal SYNT. The output from the working line counter CLU serves to address the image memories $MI_1$ and $MI_2$ from a 10-bit address bus. The writing and reading of data in the image memories $MI_1$ and $MI_2$ are performed under the control of a bus comprising three times 8 bits, with this being done in writing from the analog-to-digital converter ADC, and in reading to the data inputs D of the digital-to-analog converter DAC which also receives a composite synchronization signal SYNC-TTL supplied by the circuit BVP/SYN.

In the configuration of FIG. 7, the line address ADRL is supplied directly in conventional manner to the image memories $MI_1$ and $MI_2$, whereas the pixel addresses ADRP are supplied by taking account of the correspondence table that is stored in the pixel transcoding memory MPT.

It should be observed that in all cases of processing applied to pixels at 25 images per second, the size of the memory can be very small since the processing can be performed line by line instead of image by image (or field by field).

FIG. 8 shows a transcoding module in which the input is at 25 interlaced images per second while the output is at 50 progressive images per second, with processing being by pixel. For write operations, the organization of the architecture is the same as in FIG. 7 (circuits D1, PCP, CPI, MPT, PCL, CLU, D2, E1 and E2). The difference in architecture relates to reading because of the need to generate synthetic synchronization signals at 50 images per second (or at 60 images per second for the NTSC standard).

To synthesize these synchronization signals, the transcoding module has a second working pixel counter CPI2 whose count input H is connected to the output of an AND gate E3 having one input that receives the 2×HLP signal provided by the synchronization circuit SYN and whose other input is connected to the output of a second pixel precounter PCP2 whose count input H receives the 2×HLP signal. A synthetic synchronization generator GSS receives from the circuit BVP/SYN both the field synchronization signals SYNT and the line synchronization signals SYNL together with the signal 2×HLP. By way of example, the circuit GSS may be an LM 1882 integrated circuit (National Semiconductor). On the basis of these signals, it provides at its output a synthetic field synchronization signal SYNTS and a line synchronization signal SYNLS corresponding to a video image in 50 progressive images per second mode in the present example. The circuits CPI2 and PCP2 are reset to zero at the beginning of each line by the signal SYNLS. The signal SYNLS is applied to the count input H of a line precounter PCL2 which is reset to zero by the signal SYNTS. The output of the line precounter PCL2 is applied to an AND gate E4 whose other input receives the synthetic line synchronization signal SYNLS. The output from the AND gate E4 is applied to the count input H of a working line counter circuit CLU2 which is reset to zero by the signal SYNTS. The circuit CLU2 provides line addresses for reading alternately from the memories $MI_1$ and $MI_2$. Clock sequencing is as follows: a first image in 25 interlaced images per second mode is recorded in memory $MI_1$, the following image is recorded in memory $MI_2$. While writing is taking place in the memory $MI_2$, the memory $MI_1$ is read twice over in such a manner as to produce two images at twice the rate, each of the images being in progressive mode, by reading the first line of the first field, then the first line of the second field, then the second line of the first field, then the second line of the second field, and so on.

FIG. 9 corresponds to a transcoding module having an input at 25 interlaced images per second and an output at 25 interlaced images per second with line processing, i.e. the scanning of the image lines is vertical. This module is similar to that of FIG. 7 except insofar as the pixel transcoding memory MPT is replaced by a line transcoding memory MLT which is fed by a 10-bit bus from the working line counter CLU and also by the field parity signal PTR.

FIG. 10 relates to the case of a 25 interlaced images per second input and a 25 progressive images per second output with line processing, and it differs from FIG. 8 in the same way as FIG. 9 differs from FIG. 7.

FIG. 11 shows an interversion table for pixels in N image mode, e.g. four flat anamorphosed images 31 to 34, starting from an image in fields whose line addresses are successively 0, 1, 2, 3, 4 up to 511 for the first field and 512, 513, 514, etc. up to 1023 for the second field (making 1024 lines in all).

Line address 0 corresponds to line 1 of the first field, address 512 to the first line of the second field which is the second line of the image, and so on. For "N-image" mode, with a pitch of 4, the first flat image of anamorphosed format contains pixels of ranks 1, 5, 9, 13 in each line, so that one line of a flat image in anamorphosed format has 185 pixels. The second flat image comprises pixels of ranks 2, 6, 10, 14, and so on, with the pixel of rank 2 in each original line appearing, after transcoding, on the 186th column of the image, i.e. at pixel address 185. The same applies to the third and fourth flat images in anamorphosed format with pixels 3, 7, 11, 15, etc. appearing from pixel address 370 and pixels 4, 8, 12, 16, etc. appearing from address 555 (respectively the 371th column and the 556th column).

Figure 12:
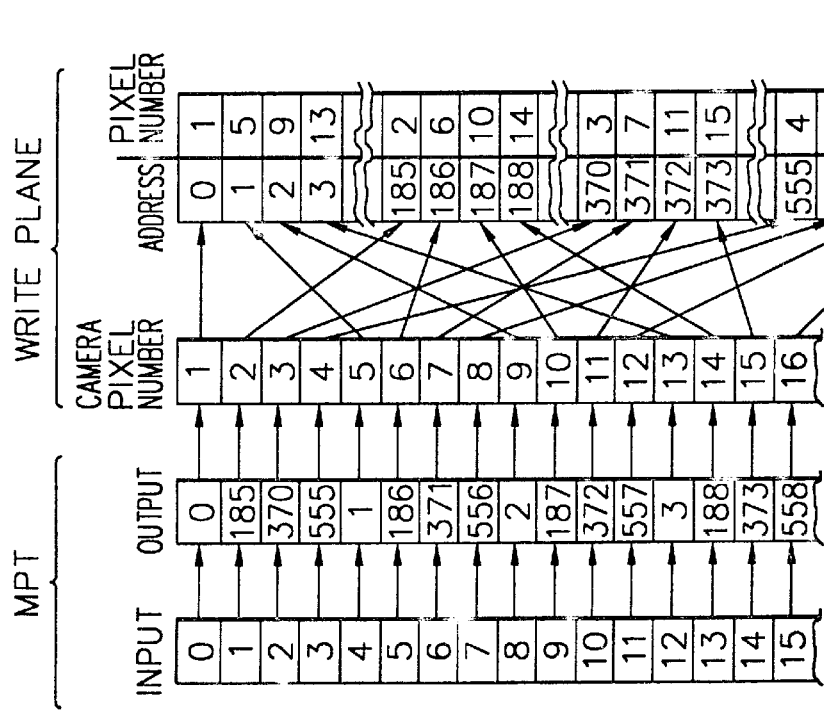
FIG. 12 shows the addressing of a transcoding pixel memory corresponding to an outlet in interlaced mode or in progressive mode.

The table stored in the pixel transcoding memory MPT and corresponding to this conversion is shown in the lefthand portion of FIG. 12 in which the first pixel of a line is applied on output at pixel address 0, the following pixel at address 1 is applied on output pixel address 185, and so on. The righthand portion shows the permutation effect obtained by the memory MPT as written to the memories $MI_1$ and $MI_2$. The first pixel from the camera is sent to address 0, the fifth pixel to address 1, the ninth pixel to address 2, the thirteenth pixel to address 3, the second pixel to address 185, the sixth pixel to address 186, and so on, thereby reproducing N image mode in which all of the information in the autostereoscopic image is conserved in the form of four flat images of anamorphosed format and without loss of information.

The diagram of FIG. 12 makes it possible, on reading, either to provide interlaced mode or progressive mode as described above. Going from interlaced mode to progressive mode merely requires special addressing of the lines being read and therefore has no influence on the pixel permutation which is the same for all the lines.

FIG. 13 shows an implementation in N image mode with a pitch of 4 and with line permutation, i.e. for an image having vertical scan lines. The first line corresponding to line address 0 remains unchanged. The second line of a flat image in anamorphosed format must be line 5 of the original image having fields, the third line must be line 9, and so on. The second flat image is made up of lines 2, 6, 10, 14, etc., of the original image having fields. The third image is made up of lines 3, 7, 11, 15, 19, etc. of the original image having fields, and the fourth flat image of anamorphosed format is made up of lines 4, 8, 12, 16, 20, etc. of the original image having fields. Each flat image comprises 144 vertical lines, i.e. a total number of lines equal to 576 in the above example.

The line transcoding memory MLT shown in the lefthand portion of FIG. 14 corresponds to the table of FIG. 13 (but at a pitch of N=8). The organization of an image memory $MI_1$ or $MI_2$ as mentioned in FIGS. 5 and 6 is recalled. The first line of address 0 of the first field becomes, on output, the first line of address 0, the second line of address 1 of the first field becomes, on output, the 145th line of address 144, and so on. For the second field, the first line of address 512 becomes, on output the line of address 72. Given that the image comprises 576 lines in the present example, each flat image has a width of 72 lines. Further, the conversion table takes account of the fact that the image output is provided in interlaced mode. The righthand portion of FIG. 14 is similar to FIG. 12 and shows the result of address permutation performed when writing into the memories $MI_1$ and $MI_2$, with the first flat image being made up of lines 1, 9, 17, 25, etc., and so on.

Figures 15, 19, 21:
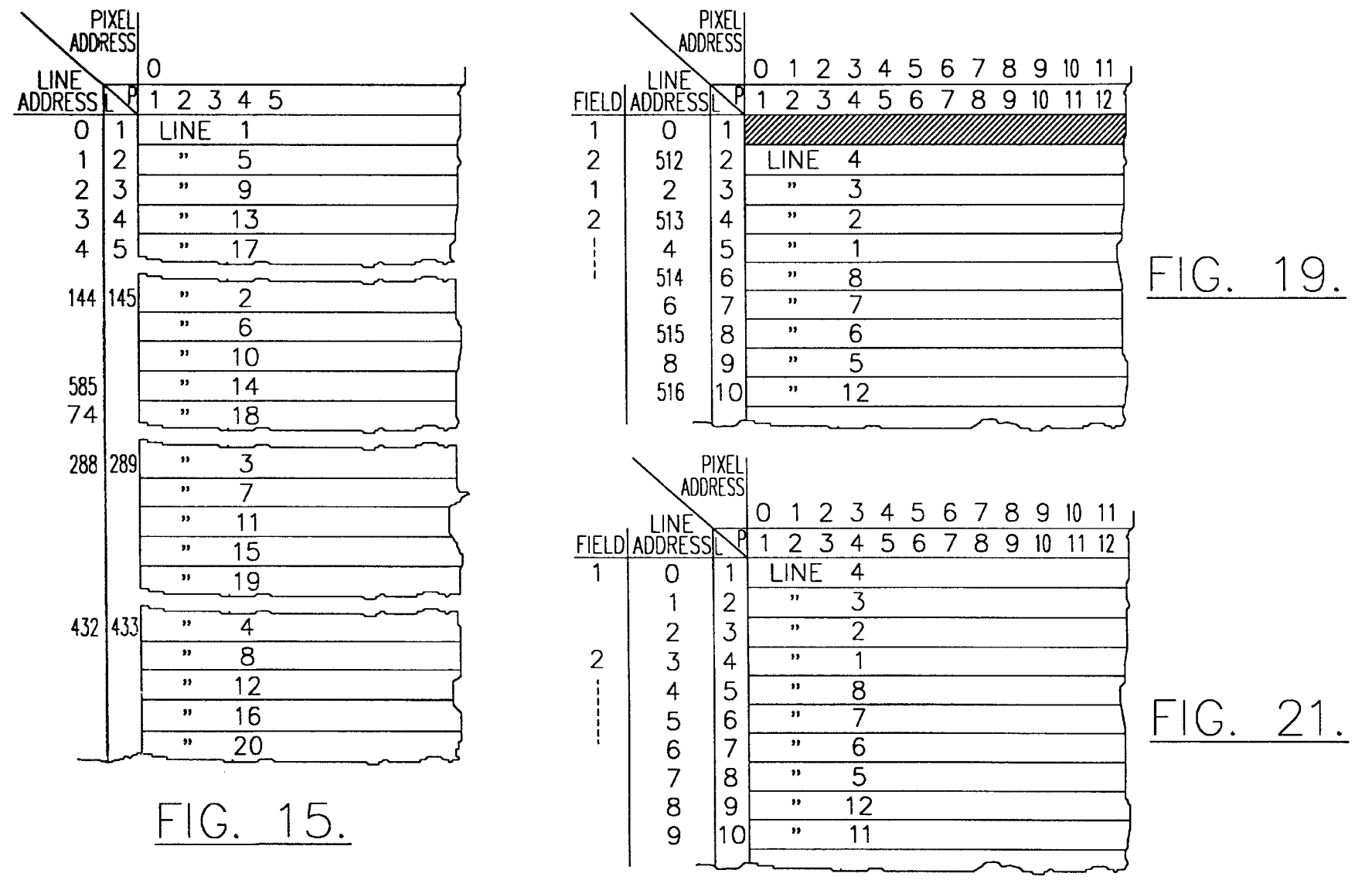
Figures 16, 17, 18:
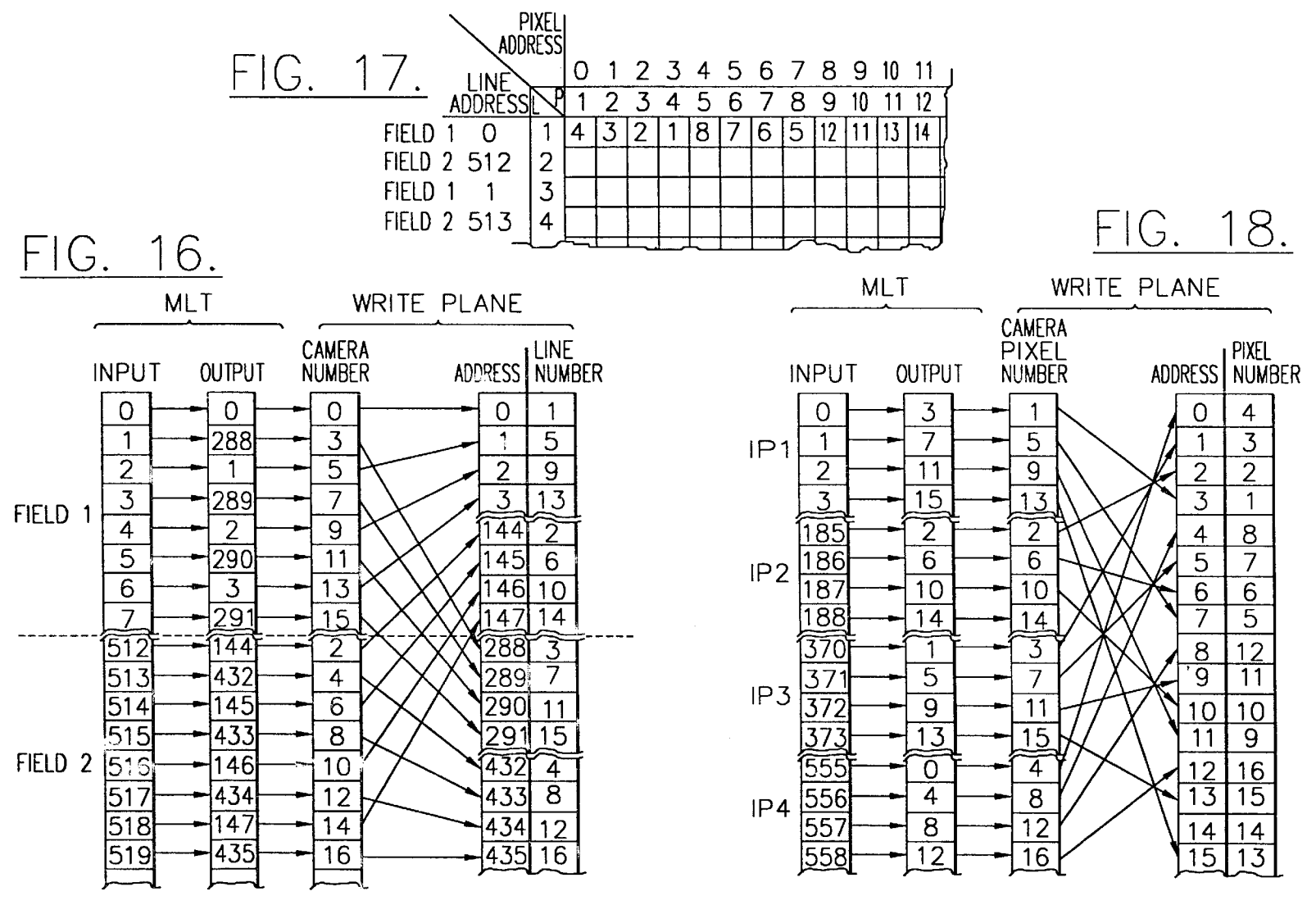

FIG. 15 corresponds to the case shown in FIG. 13 but for output in progressive mode, with the resulting correspondence in the line transcoding memory MLT and in the write plane being shown in FIG. 16. For N=4, each flat image has a width of 144 lines. The first line of the first field retains its address (=0). The first line of the second field which is the second line of the original image is positioned at address 144, and so on.

A CCD camera records a full image in two stages (field 1, then field 2). Between the two fields, a moving scene will have shifted. During playback, it is necessary to keep account of the ages of fields, otherwise a front/back effect occurs that is increasingly pronounced as movement in the scene becomes increasingly ample and rapid. By displaying the image all on a single occasion (progressive mode), the time shift of the fields gives rise to slight fuzziness only.

The following figures show how it is possible to go from an image transcoded in N anamorphosed image mode to an output in relief mode, while taking account of the fact that the original image was in inverse relief.

For a horizontally scanned image, i.e. in "pixel mode", the conversion is shown in FIG. 17 in which the first four pixels 1, 2, 3, 4 of a line are inverted. The first of the pixels is pixel No. 4, the second is No. 3, the third is No. 2, and the fourth is No. 1, and so on. It may be observed that this inversion has already been described as such in above-mentioned U.S. Pat. No. 5,099,320. FIG. 18 shows a conversion table in the pixel transcoding memory MPT for an input in N image mode (cf. FIG. 12) and an output in true relief mode, regardless of whether the image is in interlaced mode or in progressive mode. The righthand portion of the figure shows the result of the transcoding performed by writing into the memories $MI_1$ and $MI_2$. The first pixel of the relief image is constituted by the first pixel of flat image IP4. Its address (555) becomes (0), the second, third and fourth pixels of the relief image are respectively constituted by the first pixel of flat image IP3 (address 370), of IP2 (address 185), and of IP1 (address 0), and so on.

Figure 20:
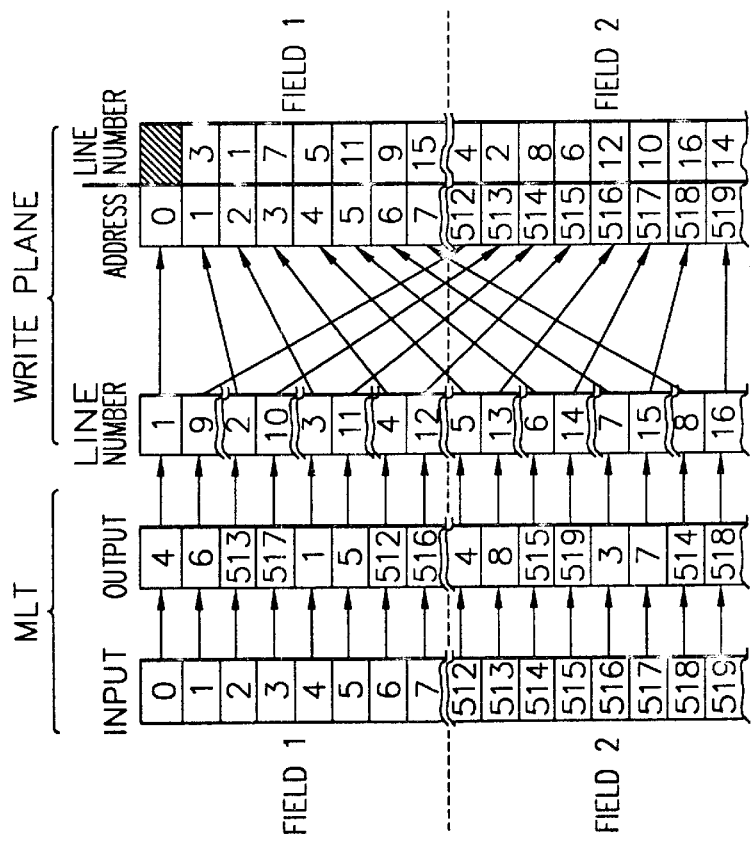
FIG. 20 is an addressing table for a transcoding line memory with an input in N image mode and an output in relief mode for an interlaced image.

FIG. 19 shows the case of an input in N image mode by lines with an interlaced output in relief mode with a pitch of N=4. FIG. 20 is the table corresponding to the transcoding line memory MLT and the consequence that results from writing thereto.

Figure 22:
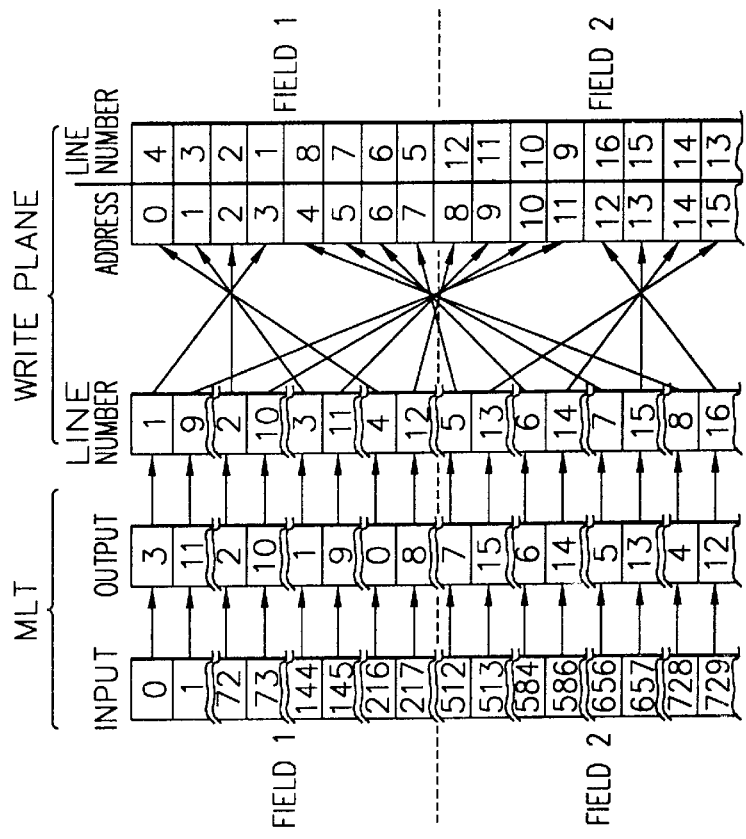
FIG. 22 is a table corresponding to an input in image mode and an output in relief mode in progressive mode.

FIG. 21 corresponds to the case shown in FIG. 20 except that the image is output in progressive mode, in application of the table of FIG. 22.

Figure 23:
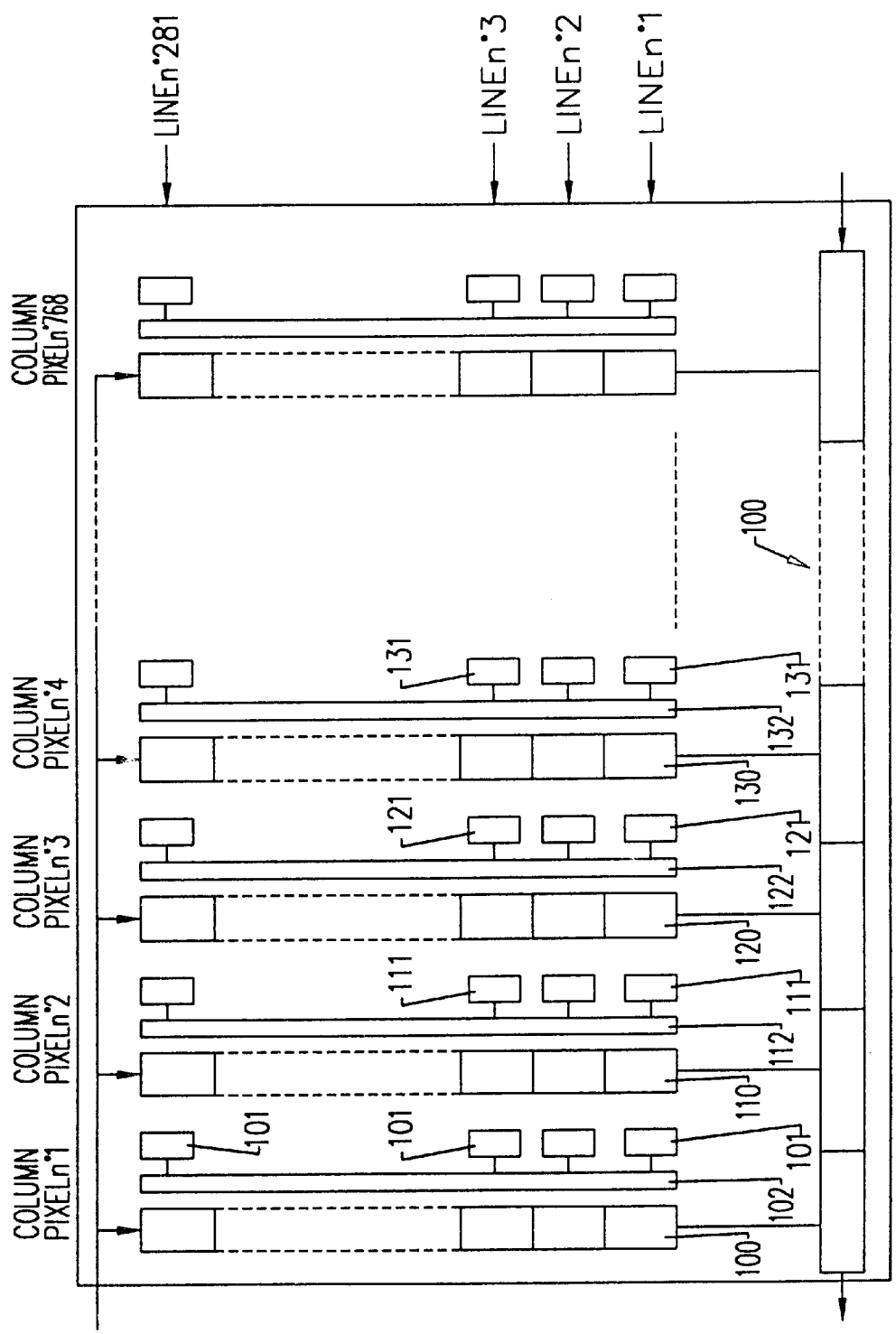
FIG. 23 shows a charge-coupled sensor organized to perform transcoding on columns of pixels.

The invention can be implemented in ways other than transcoding the image on the basis of digital conversion. In particular, the transcoding may be performed directly in the charge-coupled sensor CCD. FIG. 23 shows transcoding that may be performed in line mode by interposing identical transcoding matrices 102, 112, 122, 132, etc., which matrices are hard-wired and interposed between the photosensitive elements that are organized in columns 101, 111, 121, 131, etc., and the pixel column shift registers respectively 100, 110, 120, 130, etc. The transcoded image is recovered by the output shift register 200.

Figure 24:
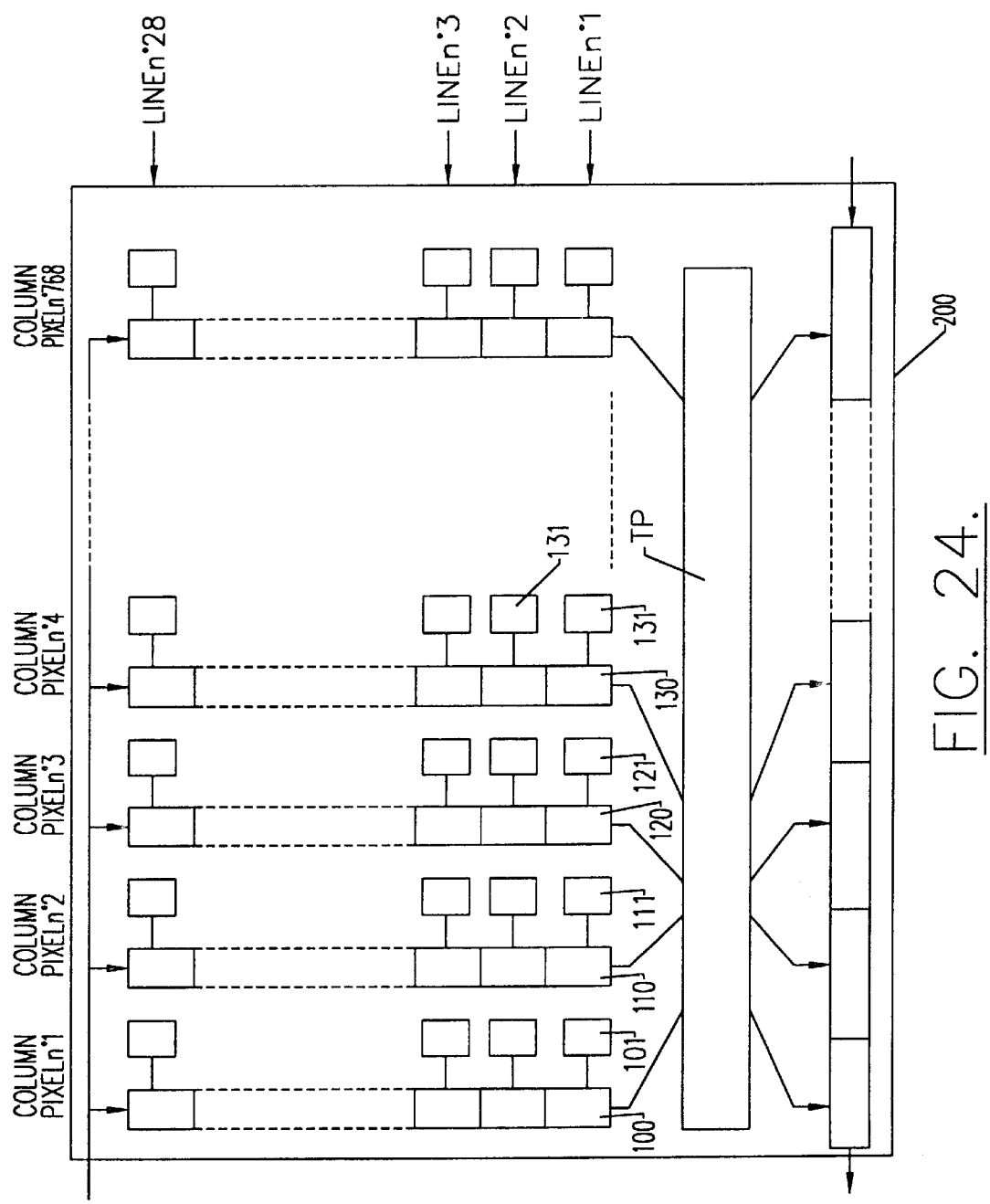
FIG. 24 shows a charge-coupled sensor for implementing transcoding by means of a line by line shift register.

In FIG. 24, the outputs of the shift registers 100, 110, 120, 130, etc. are fed into a pixel transposition matrix TP which has interconnections that ensure that the pixels in the output register 200 are properly reorganized in application of the desired transcoding mode.

Figure 25A:
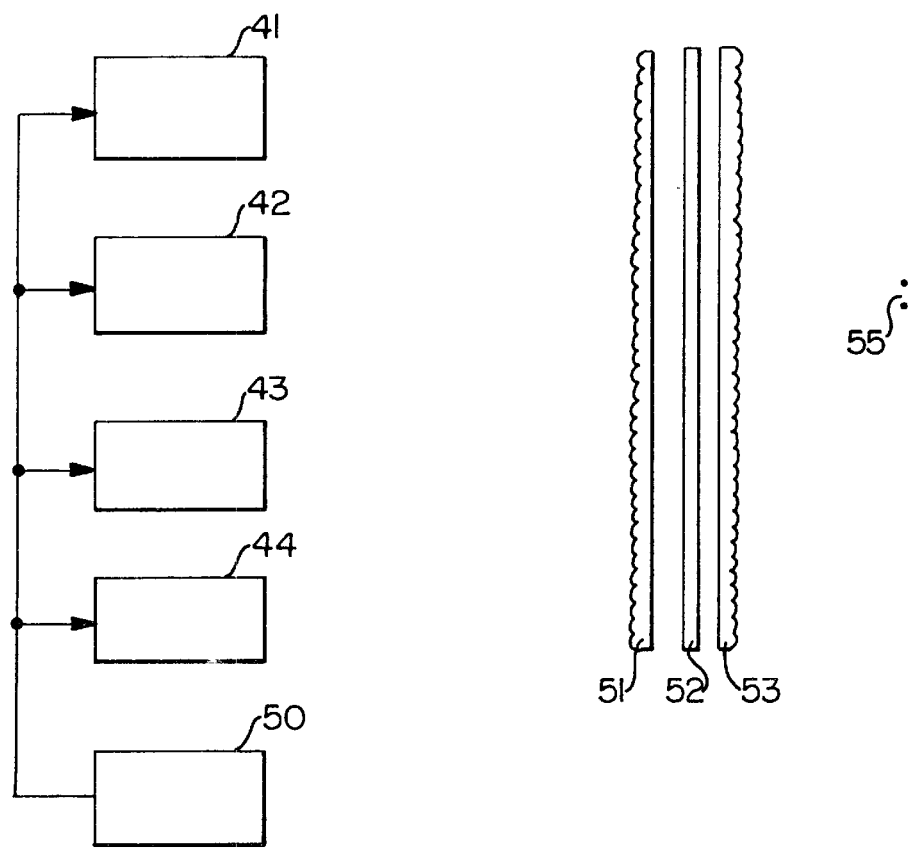
FIG. 25a shows a projection (or back projection) device of the invention.

FIG. 25a shows a projection device (or back projection device) having four projectors 41, 42, 43, and 44 fed by an electronic system 50, each sending a flat image onto a display device, the various flat images being superposed. It will be understood that in the meaning of the present application, the term "projector" should be understood generically and in particular that it includes back projectors, i.e. projectors fitted with one or more mirrors.

The embodiment of FIG. 25a uses four liquid crystal video projectors 41 to 44 of the SHARP XV100 type, each of which has a resolution of 280 lines with 370 points per line in true superposed red, green, and blue colors. The image points or pixels are square in shape.

The images are projected on a frosted screen 52 through a first optical array of the type comprising vertical cylindrical lenses or of the parallax barrier type. Downstream from the screen 52, there is a second optical array of the vertical cylindrical lens type. The image is observed by the eyes of an observer 55. A description of parallax barriers can be found, in particular in the article by Ian Sexton entitled "Parallax barrier display systems", published under the reference 99/2173, in the proceedings of the colloquium on stereoscopic television held on Oct. 15, 1992 by the Institution of Electrical Engineers, London 1992.

To obtain a stereoscopic display for four viewpoints, each projector 41 to 44 projects a flat image, the four flat images being superposed on the frosted screen in conventional manner. As explained below, in an advantageous embodiment, in this mode of projection it is possible to use flat images in transcoded anamorphosed format as described above, and optionally recorded on a medium. In this case, the camera system is preferably used in its "pixel mode" version. Since the projectors use liquid crystal screens that have better remanence than cathode ray tubes, there is no need to operate in progressive 50 Hz mode. In other words, each fourth of the image contains the same pixels as in N image pixel mode, but they are reproduced differently on the screen, each fourth of the image being deanamorphosed and occupying the entire screen, with the various images being superposed. The stereoscopic effect is reconstituted by the directional effect obtained by the array 53.

The maximum number of pixels available in a line is 740 in the application given by way of example, giving a maximum of 185 pixels per source. The SHARP XV100 back projector has a definition of about 380 pixels per line, i.e. half that of a television but twice that of the information available from each source.

Each SHARP XV100 projector includes a source of white light, three liquid crystal panels, mirrors with coatings for filtering red, blue, or green rays depending on the panel, and a single optical system having a focal length of 90 mm.

The four images are superposed on the projection plane by the optical systems being off-center, the planes of the panels remaining parallel to the planes of the images and the edges of each image being exactly superposed and rectangular.

As shown in FIG. 25a, a few millimeters from the image plane (frosted screen 52), the four elementary images are cut up into slices by the optical array 51 so that for each of the four viewpoints there are formed small vertical lines that are interleaved and equal in number to the number of microlenses in the array used, without there being any superposition of the light information or absence thereof on the fine frosted screen used as the image plane.

According to the invention, the pitch of the array 51 is chosen so as to avoid any moiré effect with the smallest periodic structure in the displayed image, i.e. the pitch of the array is smaller than half a pixel. By way of example, for an image that is 0.9 meters wide, the array 51 has a pitch of about 0.8 mm, giving 0.2 mm wide elementary lines per viewpoint (modulo 0.8 mm) for an image having four viewpoints.

Figure 25B:
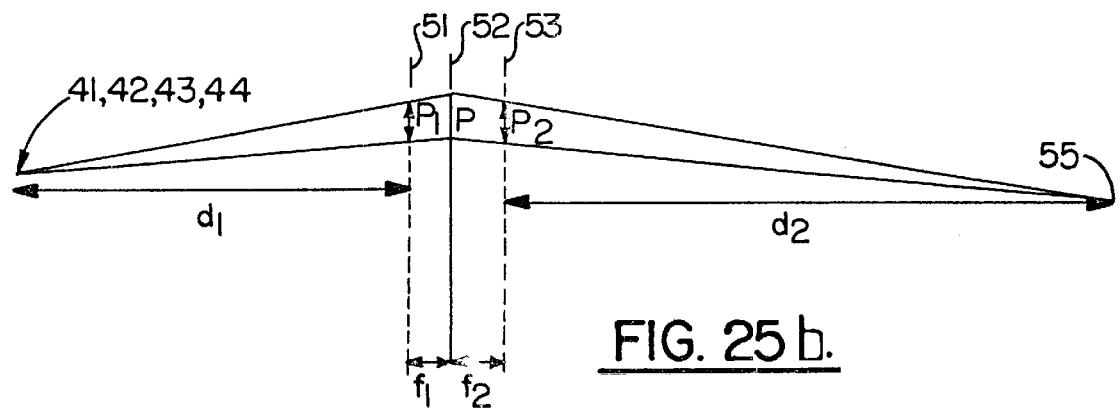
FIG. 25b is a diagram showing the condition for obtaining a solid color.

For the projectors 41 to 44 disposed at a distance $d_1$ from the array 51 of pitch $p_1$ and of focal length $f_1$ (see FIG. 25b), and for a spectator placed at a distance $d_2$ from the array 53 of pitch $P_2$ and of focal length $f_2$, the condition for obtaining a solid color is:

$$P_1/P_2 = d_1/d_2 \frac{(f_2 + d_2)}{(f_1 + d_1)}$$

When observing the resultant image on the frosted screen 52, it is possible to see that the entire surface of the screen is illuminated and that every 0.2 mm there is a change in viewpoint. It is necessary to travel horizontally through a distance equal to the total width of the image divided by the number of pixels for each viewpoint in order for the information of each viewpoint to be modified. As a result, the high frequency of the image is associated with the pitch of the array 51 and that is significantly higher than the initial pixel frequency. This avoids moiré phenomena without degrading image definition.

The second optical lens array 53 located between the spectator 55 and the frosted screen 52 is selected so as to enable binocular observation of the multiplexed image, the pitch and the focal length of the array 53 being selected in such a manner that, at the selected observation distance the spectator perceives in each eye only one viewpoint (a solid color, i.e. without moiré fringes), and that both eyes see two complementary viewpoints (a stereoscopic pair). The solid color obtained by this system depends on the ratio between the distance of the first projectors 41 to 44 from the first array 51 used for splitting up the image, and the choice of pitch and focal length for said array, relative to the distance between the spectator 55 and the observation array 53, and also the choice of pitch and focal length for that array. Adjustment can be performed by superposing lines of light coming from one of the projectors with lines coming from a lamp simulating one of the eyes of the observer for a given viewpoint.

The pitch of the lens arrays may be selected to be as small as possible given the graining of the frosted screen. If the pitch of the arrays is too small, then the graining of the screen gives rise to a loss of definition.

EXAMPLE

The projectors 41 to 44 were 100 mm apart from one another and were placed at a distance (or optical path length) of 1600 mm from the frosted screen 52. For projectors of housing width greater than 100 mm, two projectors were disposed horizontally, interposed with two projectors disposed vertically and each provided with a mirror. The first array was of the parallax barrier type having a pitch of 0.803 mm and a focal length of 3.245 mm, the frosted screen 52 being placed at the focus of the parallax array. The second array was a vertical cylindrical optical array having a pitch of 0.8 mm (i.e. slightly smaller than the pitch of the first array) and a focal length of 17.56 mm, thus making it possible to obtain a solid color for an observer placed at 3000 mm. An observer having eyes spaced apart by an inter-pupil distance of 65 mm could see viewpoints 1 and 3 or 2 and 4, and each eye could see an image for a single viewpoint without a moiré pattern.

Figure 26:
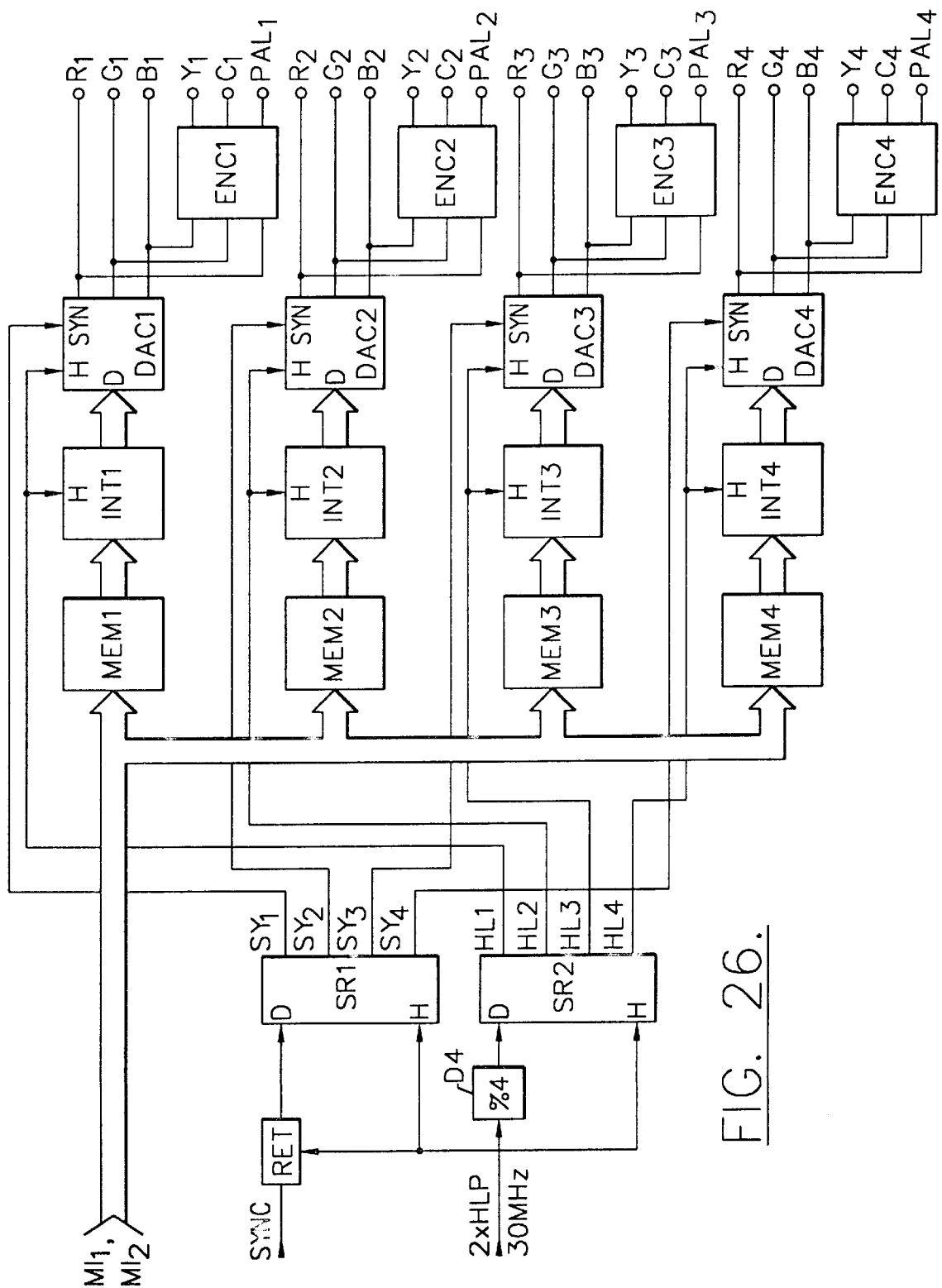
FIG. 26 shows an output module enabling the projection device of FIG. 25 to be fed with flat images of anamorphosed format and with intermediate pixels being interposed to increase resolution.

FIG. 26 shows an output module for feeding the projectors 41 to 44. It comprises an interpolation delay compensator circuit RET whose output feeds a first shift register SR1. The circuit RET is fed with the original composite synchronization SYNC and also with the pixel clock 2×HLP at double rate (30 MHz). The double rate pixel clock signal 2×HLP feeds the data input of a shift register SR2 via a divide-by-four circuit D4 and it feeds the clocking inputs of the shift registers SR1 and SR2. The shift register SR1 produces shifted synchronization signals SY1, SY2, SY3, and SY4 which are fed to the synchronization inputs of digital-to-analog converters DAC1, DAC2, DAC3, and DAC4 each corresponding to one of the projectors 41 to 44. The shift register SR2 provides the line clock signals HL1, HL2, HL3, and HL4 at its outputs, which signals are applied to the clock inputs H of the converters DAC1, DAC2, DAC3, and DAC4, and also to the clock inputs H of interpolators INT1, INT2, INT3, and INT4. Memories MEM1, MEM2, MEM3, and MEM4 for performing amplitude corrections are disposed as buffers between the outputs of the memories $MI_1$ and $MI_2$ of the above-described transcoding modules and the data inputs of respective interpolation circuits INT1, INT2, INT3, and INT4. The converters DAC1, DAC2, DAC3, and DAC4 produce red, green and blue signals R1, G1, B1; R2, G2, B2; R3, G3, B3; and R4, G4, B4 which are suitable for feeding the projectors 41 to 44 via video encoders operating in the PAL standard or in the S-VHS standard, which encoders are referenced as ENC1, ENC2, ENC3, and ENC4.

Figures 27, 28:
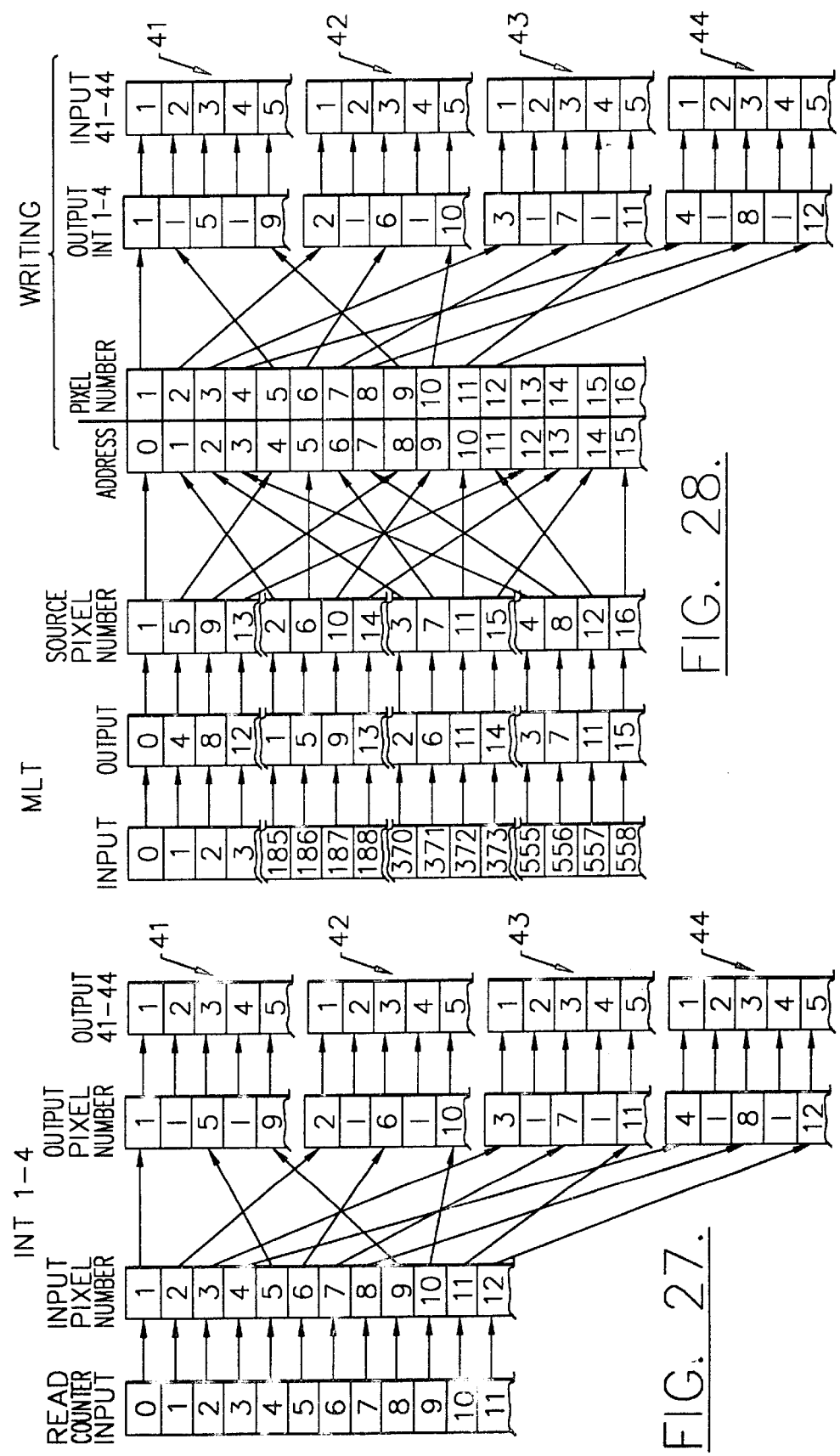
FIG. 27 shows an scheme for addressing interpolators in each of the projectors.
FIG. 28 is an addressing table for a transcoding pixel memory for an input in N image mode at 4 pitch, an output in N image mode at 4 pitch, with transcoding and interpolation.

FIG. 27 shows a transcoding operation suitable for passing from a pitch 4 relief image to a set of non-anamorphosed flat images each suitable for being applied to a respective one of the projectors 41 to 44. The projector 41 thus receives pixels 1, 5, 9, etc., the projector 42 receives pixels 2, 6, 10, etc., the projector 43 receives pixels 3, 7, 11, etc., and the projector 44 receives pixels 4, 8, 12, and so on. Between each of the pixels 1, 5 and 9 there are interposed intermediate pixels represented by the letter I, and the same applies to each of the projectors 41 to 44.

FIG. 28 shows a transcoding operation starting from N images in anamorphosed format, with this transcoding on the pixels (pixel transcoding memory MPT) making it possible to deanamorphose and to interpolate the images so as to provide the pixels in the proper order to the projectors 41 to 44.

The invention is not limited to the embodiments described and shown. In particular, it may be observed that the lens array 20 acts in one direction only (horizontally). A linear object having a horizontal axis and placed at infinity gives rise to a real image in the downstream focal plane P of the array 20 (downstream in the propagation direction of the light rays). A linear object having a vertical axis placed at infinity gives a real image substantially at the focus F of the entrance objective ($L_1$, $L_2$) which focus F must be situated upstream from the diverging lens array 20. This gives rise to astigmatism which, in the present case, can disturb focusing, particularly on distant objects.

To compensate it, it is possible to place a diverging cylindrical lens 40 of long focal length e.g. downstream from the pupil $P_2$ of the entrance objective, and preferably between $L_1$ and $L_2$, the generator lines of the diverging lens 40 being horizontal (i.e. it is crossed relative to the lens array 20 which is disposed vertically). Its focal length is calculated to move together and preferably cause to coincide the convergence point for vertical objects and the focal plane F of the diverging array.

For horizontal objects, the light rays converge on the focus F and a virtual image is formed on the plane P. For vertical objects, the cylindrical lens 51 crossed with the lens array 20 has the effect of causing real images thereof to be formed in the plane P.

Another solution is to place a second converging lens array practically in the same plane as the first, having the same focal length as the first, or a focal length calculated so that the two focal planes coincide, and whose pitch corresponds to a pixel (on one-fourth the pitch of the first array for square pixels and four viewpoints). The pupil parameters are then fixed.

The transfer method of the invention is appropriate for any type of autostereoscopic image, and in particular for synthesized images.

I claim:

1. A method of transferring autostereoscopic images comprising the steps of:

transcoding the autostereoscopic image to make a transcoded image having a plurality of flat images of anamorphosed format equal in number to stereoscopic viewpoints wherein the flat images of the anamorphosed format are positioned side by side; and transferring the transcoded image.

2. A method according to claim 1, wherein the anamorphosed format of the transcoded image is substantially the same as the autostereoscopic image.

3. A method according to claim 1 further comprising the step of recording the transcoded image which is performed on a standard analog video recorder.

4. A method according to claim 1 wherein the transferring step is implemented digitally, with application of a bit rate compression algorithm.

5. A method according to claim 4, wherein the algorithm is a vectorization algorithm.

6. A method according to claim 1, wherein the transcoding step includes a first step of digitizing the autostereoscopic image, a second step of storing the transcoded image wherein the transcoding is performed by a transcoding memory for write addressing to be performed for at least one image memory, and a third step of reading the at least one image memory.

7. A method according to claim 6, wherein the transcoding step includes a fourth step of converting the transcoded image to analog form for an analog recording thereof.

8. A method according to claim 6, wherein the at least one image memory is a pixel transcoding memory and the transcoding is performed by permutation of the pixels on each line.

9. A method according to claim 6, wherein the at least one image memory stores at least one image line.

10. A method according to claim 8 wherein the transcoding memory is such that an interlaced scan image is transformed into progressively scanned anamorphosed flat images.

11. A method according to claim 10, the reading step is performed at twice the rate of the autostereoscopic image.

12. A method as in claim 1, further comprising the step of reverse transcoding which performs a transcoding operation that is the inverse of an operation performed during said transcoding step so as to reconstitute autostereoscopic images.

13. A method of transferring autostereoscopic images comprising:

generating a transcoded image having a plurality of flat images of anamorphosed format equal in number to the stereoscopic viewpoints wherein the flat images of the anamorphosed format are positioned side by side;

transferring the transcoded image; and performing a reverse transcoding of the transcoded image so as to reconstitute autostereoscopic images.

* * * * *

UNITED STATES PATENT AND TRADEMARK OFFICE
CERTIFICATE OF CORRECTION

PATENT NO. : 5,946,027
DATED : August 31, 1999
INVENTOR(S) : Allio

It is certified that error appears in the above-identified patent and that said Letters Patent is hereby corrected as shown below:

On the title page, [56] References Cited, U.S. PATENT DOCUMENTS, insert the following:

--5,101,279  3/1992  Kurematsu et al.
 5,493,427  2/1996  Nomura et al.
 5,745,288  4/1998  Miyata et al.
 5,410,345  4/1995  Eichenlaub--.

Column 6, after line 6, insert new paragraph:

--FIG. 3 illustrates an enlarged portion of FIG. 3a;--.

UNITED STATES PATENT AND TRADEMARK OFFICE
CERTIFICATE OF CORRRECTION

PATENT NO. : 5,946,024
DATED : August 31, 1999
INVENTOR(S) : Allio

It is certified that error appears in the above-identified patent and that said Letters Patent is hereby corrected as shown below:

On the title page, insert the following:

U. S. PATENT DOCUMENTS

| EXAMINER INITIAL | | PATENT NUMBER | | | | | | ISSUE DATE | PATENTEE | Date of Publication of cited Document |
|---|---|---|---|---|---|---|---|---|---|---|
| | | 5 | 1 | 0 | 1 | 2 | 7 | 9 | | Kurematsu et al | 3/31/92 |
| | | 5 | 4 | 9 | 3 | 4 | 2 | 7 | | Nomura et al. | 2/20/96 |
| | | 5 | 7 | 4 | 5 | 2 | 8 | 8 | | Miyata et al. | 4/28/98 |
| | | 5 | 4 | 1 | 0 | 3 | 4 | 5 | | Eichenlaub | 4/25/95 |
| | | | | | | | | | | | |
| | | | | | | | | | | | |
| | | | | | | | | | | | |
| | | | | | | | | | | | |

Signed and Sealed this

Twenty-second Day of February, 2000

Attest:

Q. TODD DICKINSON

*Attesting Officer*     *Commissioner of Patents and Trademarks*

UNITED STATES PATENT AND TRADEMARK OFFICE
CERTIFICATE OF CORRECTION

PATENT NO. : 5,946,027

DATED : August 31, 1999

INVENTOR(S) : Allio

It is certified that error appears in the above-identified patent and that said Letters Patent is hereby corrected as shown below:

On the title page, [56] References Cited, U. S. PATENT DOCUMENTS, insert the following:

--5,101,279  3/1992  Kurematsu et al.
5,493,427   2/1996  Nomura et al.
5,745,288   4/1998  Miyata et al.
5,410,345   4/1995  Bichenlaub--.

Column 6, after line 6, insert new paragraph:
--FIG. 3 illustrates an enlarged portion of FIG. 3a;--.

This certificate supercedes certificate of correction issued February 22, 2000.

Signed and Sealed this

First Day of August, 2000

*Attest:*

Q. TODD DICKINSON

*Attesting Officer*   *Director of Patents and Trademarks*